United States Patent
Bergum et al.

(10) Patent No.: US 12,423,630 B2
(45) Date of Patent: Sep. 23, 2025

(54) THREE-POINT HITCH MOUNT SYSTEMS

(71) Applicant: Vermeer Manufacturing Company, Pella, IA (US)

(72) Inventors: Eric Bergum, Pella, IA (US); Josh Vrieze, Woodville, WI (US)

(73) Assignee: Vermeer Manufacturing Company, Pella, IA (US)

( * ) Notice: Subject to any disclaimer, the term of this patent is extended or adjusted under 35 U.S.C. 154(b) by 606 days.

(21) Appl. No.: 17/946,893

(22) Filed: Sep. 16, 2022

(65) Prior Publication Data

US 2023/0012653 A1 Jan. 19, 2023

Related U.S. Application Data

(62) Division of application No. 16/573,213, filed on Sep. 17, 2019, now Pat. No. 11,477,930.

(60) Provisional application No. 62/739,566, filed on Oct. 1, 2018.

(51) Int. Cl.
| | |
|---|---|
| *A01D 34/66* | (2006.01) |
| *A01B 59/06* | (2006.01) |
| *A01D 34/86* | (2006.01) |
| *A01D 101/00* | (2006.01) |

(52) U.S. Cl.
CPC .......... *A01B 59/066* (2013.01); *A01D 34/661* (2013.01); *A01D 34/866* (2013.01); *A01D 2101/00* (2013.01)

(58) Field of Classification Search
CPC ..... A01B 59/00; A01B 59/002; A01B 59/004; A01B 59/006; A01B 59/04; A01B 59/042; A01B 59/043; A01B 59/06; A01B 59/066; A01B 59/062; A01B 63/118; A01D 34/001; A01D 34/64; A01D 34/66; A01D 34/661; A01D 34/866
See application file for complete search history.

(56) References Cited

U.S. PATENT DOCUMENTS

| | | | |
|---|---|---|---|
| 3,181,288 A | 5/1965 | Halls | |
| 5,953,893 A * | 9/1999 | Smith | .................. A01D 34/661 56/320.1 |
| 7,530,405 B2 | 5/2009 | Kollath et al. | |
| 7,690,439 B2 * | 4/2010 | Priepke | ................ A01B 71/063 180/53.3 |
| 8,353,359 B2 | 1/2013 | Schwalenberg et al. | |
| 9,775,276 B2 * | 10/2017 | Hyder | .................... A01B 63/14 |
| 10,632,802 B1 * | 4/2020 | Bertalon | ................ B60D 1/363 |

(Continued)

OTHER PUBLICATIONS

Burder AG Attachments, "Smart Hitch", https://burder.com.au/products/smart-hitch/, available before Oct. 1, 2018.

(Continued)

*Primary Examiner* — Adam J Behrens

(74) *Attorney, Agent, or Firm* — Armstrong Teasdale LLP

(57) ABSTRACT

Three-point hitch mount systems for connecting an implement to a tow vehicle having two lower hitch arms and an upper link arm are disclosed. The hitch mount systems may include a lift bar configured to be attached to the two hitch arms of the tow vehicle. The hitch mount systems may include a yoke assembly. The yoke assembly includes a forward-facing slot and a downward-facing slot for removably receiving the lift bar.

16 Claims, 25 Drawing Sheets

(56) References Cited

U.S. PATENT DOCUMENTS

| 2004/0256124 | A1* | 12/2004 | White | B60D 1/07 |
| | | | | 172/439 |
| 2017/0238455 | A1* | 8/2017 | Marwitz | A01B 59/043 |
| 2017/0246924 | A1* | 8/2017 | Thompson | B60D 1/141 |
| 2020/0094636 | A1* | 3/2020 | Gygi | A01B 59/062 |
| 2020/0329624 | A1* | 10/2020 | Thorsell | A01B 59/062 |
| 2020/0337242 | A1* | 10/2020 | Billard | A01D 67/00 |
| 2021/0368666 | A1* | 12/2021 | Paulson | A01B 59/043 |

OTHER PUBLICATIONS

Chase Links, "1952 Farmall Super C", p. 1, http://www.chaselinks.com/Super_C.html, available before Oct. 1, 2018.
John Deere, "1025R Sub-Compact Tractor", section "Accessories and Attachments", sub-section "iMatch Quick-Hitch Category 1 with adjustable top hook—LVB25976". https://www.deere.com/en/tractors/compact-tractors/1-series-sub-compact-tractors/1025r/, available before Oct. 1, 2018.
JRS Farmparts (Eastman Industries Limited), "3 Point Kit for Kubota Iseki Tractor", section "Kubota Three Point Linkage Kit". Online, https://www.jrsfarmparts.com/3-point-kit-for-kubota-iseki-tractor.html#/iseki-three-point-linkage-kit, available before Oct. 1, 2018.
Vermeer Operator's Maintenance Manual, M5030/M6030/M7030/M8030 Mower, 2004, select pages (5 total).
Zuidberg North America Inc., "Quick attach A-frame", https://www.zuibergna.com/frontlinesytems/options-hitch-pto/quick-attach-frame/, available before Oct. 1, 2018.

* cited by examiner

THREE-POINT HITCH MOUNT SYSTEMS

CROSS-REFERENCE TO RELATED APPLICATION

This application is a Divisional of U.S. Non-provisional patent application Ser. No. 16/573,213, filed Sep. 17, 2019, which claims the benefit of U.S. Provisional Patent Application No. 62/739,566, filed Oct. 1, 2018. Both applications are incorporated herein by reference it their entirety.

FIELD OF THE DISCLOSURE

The field of the disclosure relates to three-point hitch mount systems for mounting an implement and, in particular, systems that include a yoke assembly having a forward-facing slot and a downward-facing slot and receiving a lift bar connected to the tow vehicle.

BACKGROUND

Many implements, such as disk mowers, are mounted to the tow vehicle (e.g., tractor) with the tow vehicle carrying the implement when lifted from the ground. Such implements are often offset to the side of the vehicle (i.e., are cantilevered from the hitch mount). The implement may be lowered to the ground for operation which shifts or even reverses the loads applied to the lower lift arms. Conventionally, such implements are connected by use of a hitch mount system which requires the left and right sides of the hitch components of the tow vehicle to be vertically aligned with the hitch components of the implement while reversing the tow vehicle to the implement.

A need exists for hitch mount systems that can reliably absorb loads that change or even reverse during use of the implement, that allow the implement to be relatively easily and quickly connected to the tow vehicle, that allow the implement to be mounted to a variety of tow vehicles (e.g., tractors), and/or that allow the implement to be connected when the implement is setting on an uneven surface.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a three-point hitch mount system for attaching an implement to a tow vehicle having two lower hitch arms and an upper link arm. The three-point hitch mount system includes a lift bar configured to be attached to the two lower hitch arms of the tow vehicle. The three-point hitch mount system includes a yoke assembly configured to be attached to the implement. The yoke assembly includes a first arm having a forward-facing lift bar slot for removably receiving the lift bar. The yoke assembly includes a second arm having a downward-facing lift bar slot for removably receiving the lift bar. The three-point hitch mount system includes an upper link mount configured to be connected to the upper link arm.

Another aspect of the present disclosure is directed to an implement attachable to a tow vehicle having two lower hitch arms and an upper link arm that is connected to the tow vehicle. The implement includes a three-point hitch mount system. The three-point hitch mount system includes a lift bar configured to be attached to the two lower hitch arms of the tow vehicle. The three-point hitch mount system includes a yoke assembly. The yoke assembly includes a first lift bar slot for removably receiving the lift bar. The first lift bar slot has a first lift bar slot upper surface for contacting the lift bar when coupling the implement to the tow vehicle. The yoke assembly includes a second lift bar slot for removably receiving the lift bar. The second lift bar slot has a second lift bar slot upper surface for contacting the lift bar when coupling the implement to the tow vehicle. When detached from a tow vehicle, the first lift bar slot upper surface is disposed below the second lift bar slot upper surface such that the lift bar contacts the first lift bar slot upper surface before contacting the second lift bar slot upper surface when raising the lift bar to connect the lift bar to the yoke assembly. The three-point hitch mount system includes an upper link mount configured to be connected to the upper link arm. A device is connected to the three-point hitch mount system.

Yet another aspect of the present disclosure is directed to a method for connecting a tow vehicle to an implement. The tow vehicle has first and second lower hitch arms that are connected to a lift bar. The implement has a yoke assembly that includes a first arm having a forward-facing lift bar slot and a second arm having a downward-facing lift bar slot. The lift bar is vertically aligned with the forwarding-facing lift bar slot. The tow vehicle is propelled toward the implement to cause the lift bar to be received in the forward-facing lift bar slot. The first and second lower hitch arms are lifted after the lift bar has been received in the forward-facing lift bar slot to cause the lift bar to be received in the downward-facing lift bar slot. An upper link is connected to the implement.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
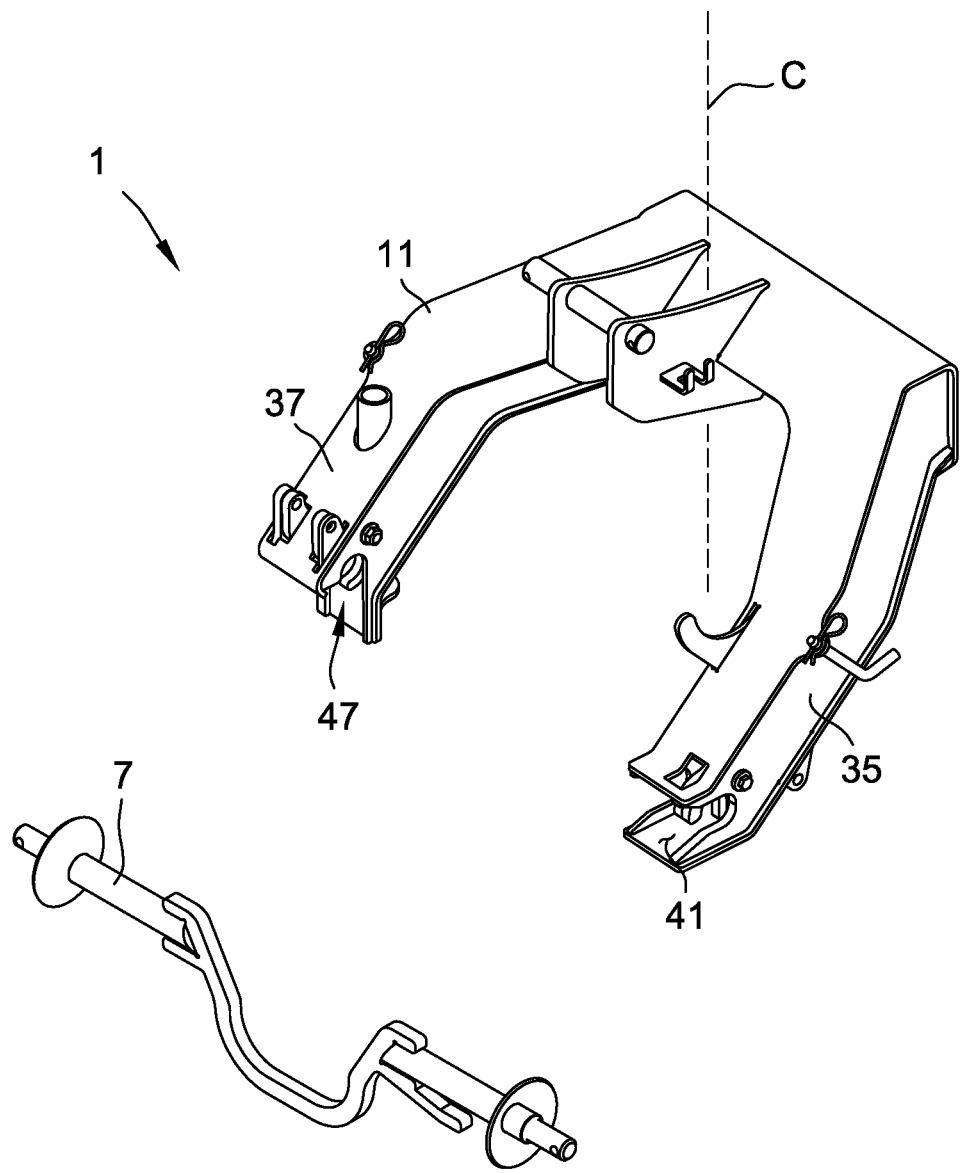
FIG. 1 is a perspective view of a three-point hitch mount system.
Figure 2:
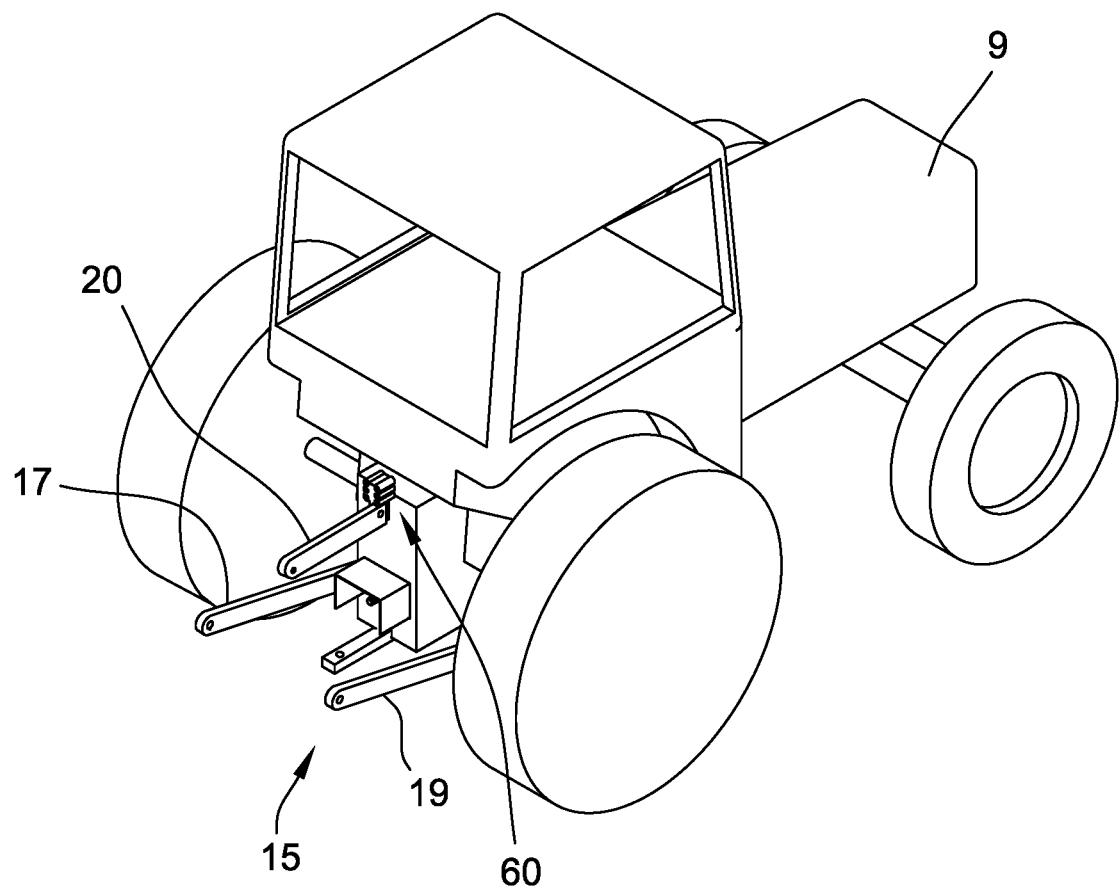
FIG. 2 is a perspective view of a tow vehicle.
Figure 3:
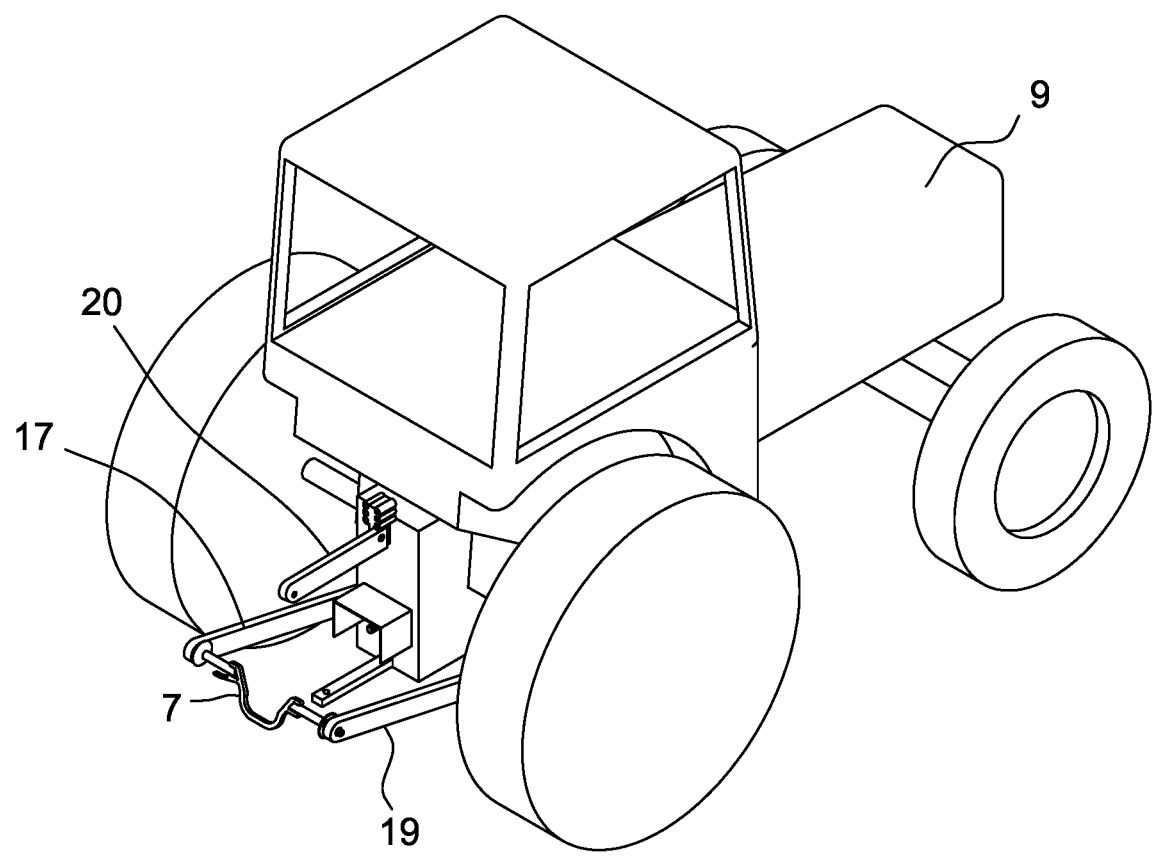
FIG. 3 is a perspective view of a tow vehicle having a lift bar connected thereto.

An embodiment of a three-point hitch mount system is generally referred to as "1" in FIG. 1. The three-point hitch mount system 1 (or simply "hitch mount system") includes a lift bar 7 and yoke assembly 11. The yoke assembly 11 is part of an implement 12 (FIG. 4) that includes a device 99 such as a powered device. The lift bar 7 is configured to be attached to the two lower hitch arms 17, 19 of a tow vehicle 9 (FIG. 2). Once the lift bar 7 is attached to the two lower hitch arms 17, 19 of the tow vehicle 9 as shown in FIG. 3, the tow vehicle 9 and lift bar 7 are connected to the yoke assembly 11.

Figure 5:
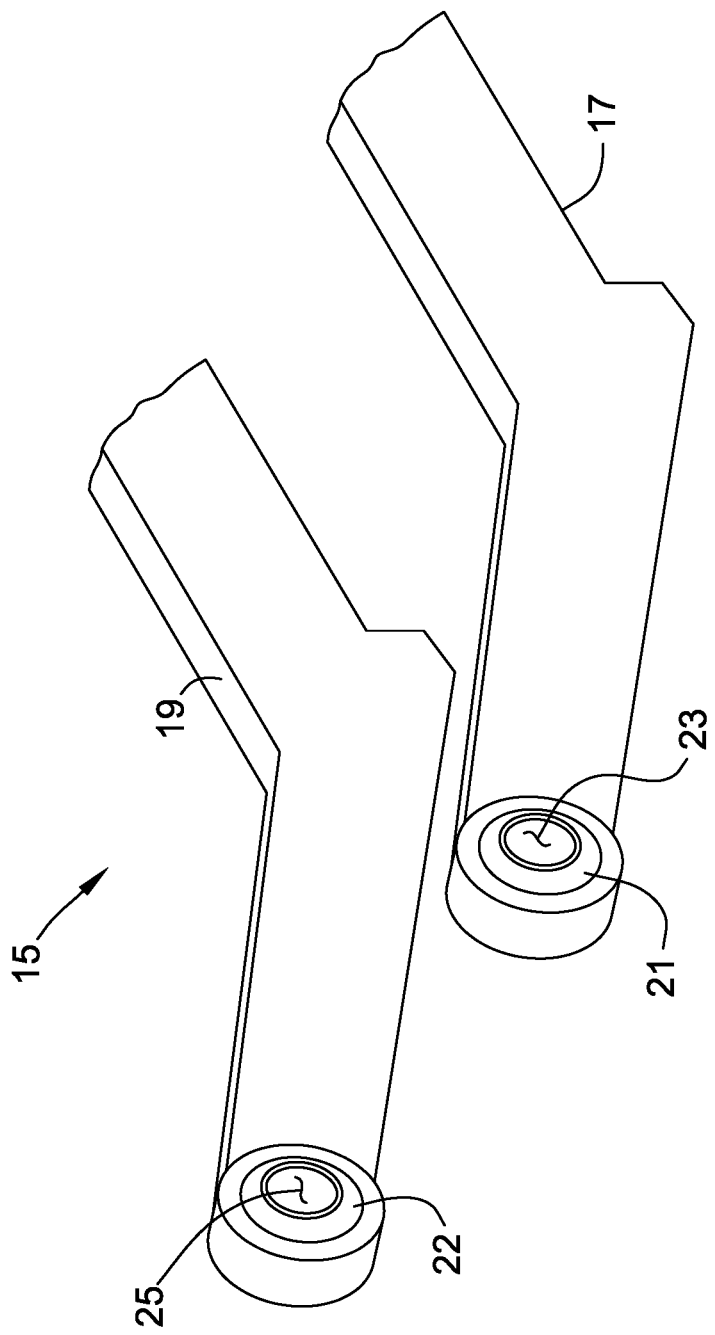
FIG. 5 is a perspective view of the two lower hitch arms of the tow vehicle.

An exemplary three-point hitch 15 of a tow vehicle 9 to which the three-point hitch mount system 1 may be attached is shown in FIG. 2. The three-point hitch 15 includes two lower hitch arms 17, 19 that each has a ball joint 21, 22 (FIG. 5) toward its end. The hitch arms 17, 19 are typically raised and lowered by lift arms (not shown) of the tow vehicle 9. Each ball joint 21, 22 has an opening 23, 25 therein to couple the hitch arms 17, 19 to various implements. The two lower arms 17, 19 that include the ball joints 21, 22 may be a single piece or may be two adapter segments that are removably attached to the lower hitch arms of the tow vehicle.

Figure 6:
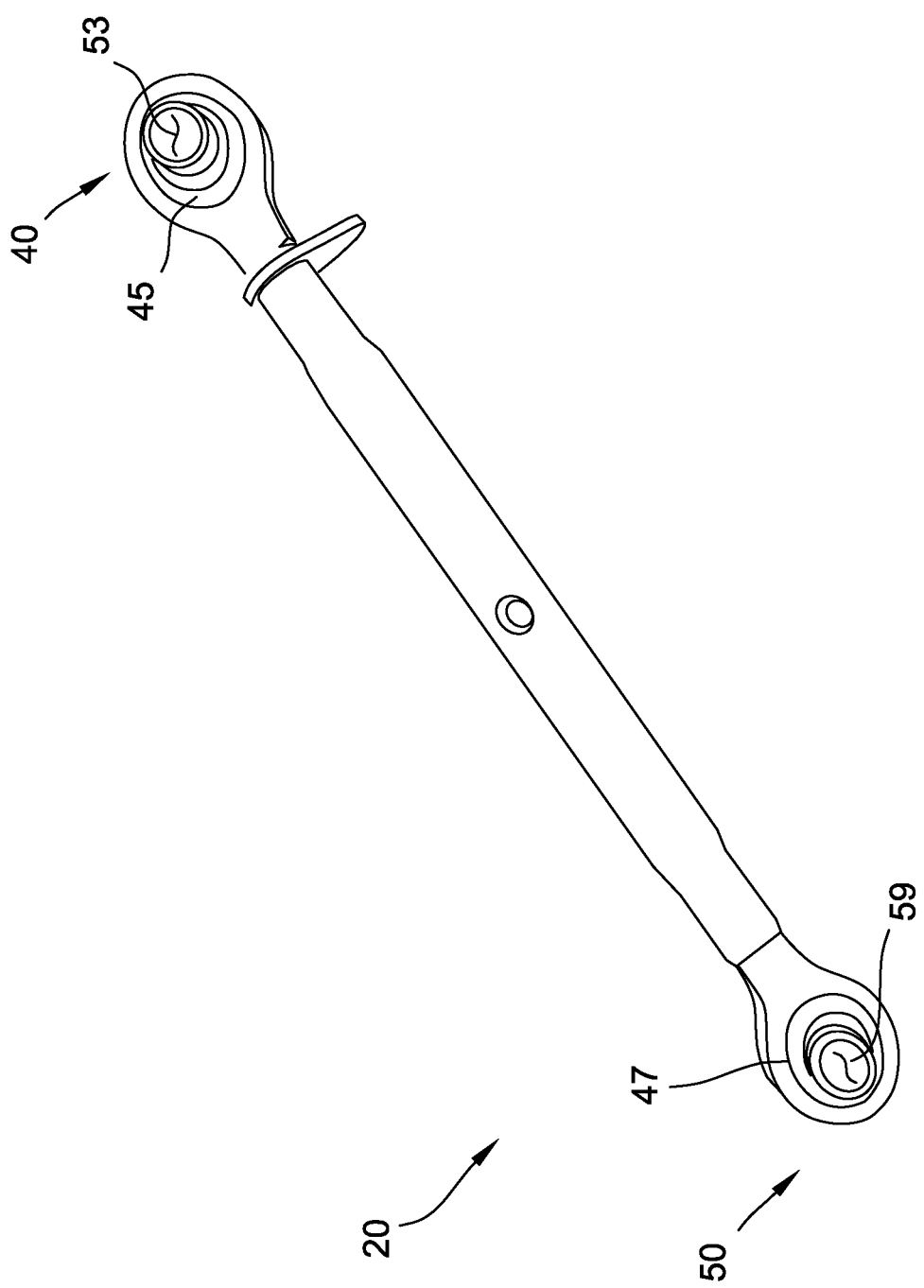
FIG. 6 is a perspective view of the upper link arm that may be connected to the tow vehicle and the implement.

The three-point hitch 15 of the tow vehicle 9 also includes an upper link arm 20. As shown in FIG. 6, the upper link arm 20 has two ends 40, 50. The upper link arm 20 may be connected to the tow vehicle 9 toward one of its ends 40, 50 and connected to the three-point hitch mount system 1 (FIG. 1) of the implement at the other end 40, 50. Generally, the upper link arm 20 is configured such that either end 40, 50 may be connected to the tow vehicle 9 and either end 40, 50 may be connected to the three-point hitch mount system 1. The upper link arm 20 may also be adjustable in length (e.g., by use of a turnbuckle or other threaded arrangement). As illustrated, the upper link arm 20 includes two ball joints 45, 47. Each ball joint 45, 47 includes an opening 53, 59 therein to couple to the tow vehicle or the implement. As shown in FIG. 2, the tow vehicle 9 includes an upper link mount 60 (e.g., bracket) for connecting the upper link arm 20 such as by use of a pin (not shown). Generally, the lower hitch arms 17, 19 and upper link arm 20 are not part of the three-point hitch mount system 1, unless stated otherwise.

The lift bar 7 is configured (i.e., sized and/or arranged) to be attached to the two lower hitch arms 17, 19 of the tow vehicle 9. The lift bar 7 has a diameter (or a portion that has such a diameter) that is less than the diameter of the openings 23, 25 of the ball joints 21, 22 to allow the lift bar 7 to be slid into the openings 23, 25 by the operator of the tow vehicle 9. The lift bar 7 has a length that allows the lift bar to extend between the hitch arms 17, 19. Such dimensions may comply with the standards set forth in ISO 730:2009 entitled "Agricultural Wheeled Tractors—Rear-mounted three-point linkage—Categories 1, 2N, 2, 3N, 4N, 4", which is incorporated herein by reference for all relevant and consistent purposes.

The lift bar 7 has a first end 28 (FIG. 7) and a second end 29 and a lift bar axis A that extends through the first end 28 and the second end 29. The lift bar 7 includes a U-shaped portion 36 this is disposed between two linear portions 38, 56. The U-shaped portion 36 may provide clearance for the driveline of the power take-off (PTO). In other embodiments, the lift bar 7 is linear and does not include a U-shaped portion as disclosed in U.S. Patent Application No. 2017/0246924, which is incorporated herein by reference for all relevant and consistent purposes.

The lift bar 7 includes two lock-pin openings 30, 32 that receive lock-pins (not shown) to prevent the lift bar 7 from sliding out of the ball joints 21, 22. Two alignment disks 31, 33 are connected to the lift bar 7 to assist in attaching the lift bar 7 to the yoke assembly 11 (FIG. 1). In other embodiments, the three-point hitch mount system 1 does not include alignment disks 31, 33.

To attach the lift bar 7 to the two lower hitch arms 17, 19 of the tow vehicle, each end 28, 29 of the lift bar 7 is slid into a ball joint 21, 22 such that each ball joint 21, 22 is between an alignment disk 31, 33 and a lock-pin opening 30, 32. After attaching the lift bar 7 to the tow vehicle, the tow vehicle is directed to the implement having the yoke assembly 11 attached thereto.

Figure 4:
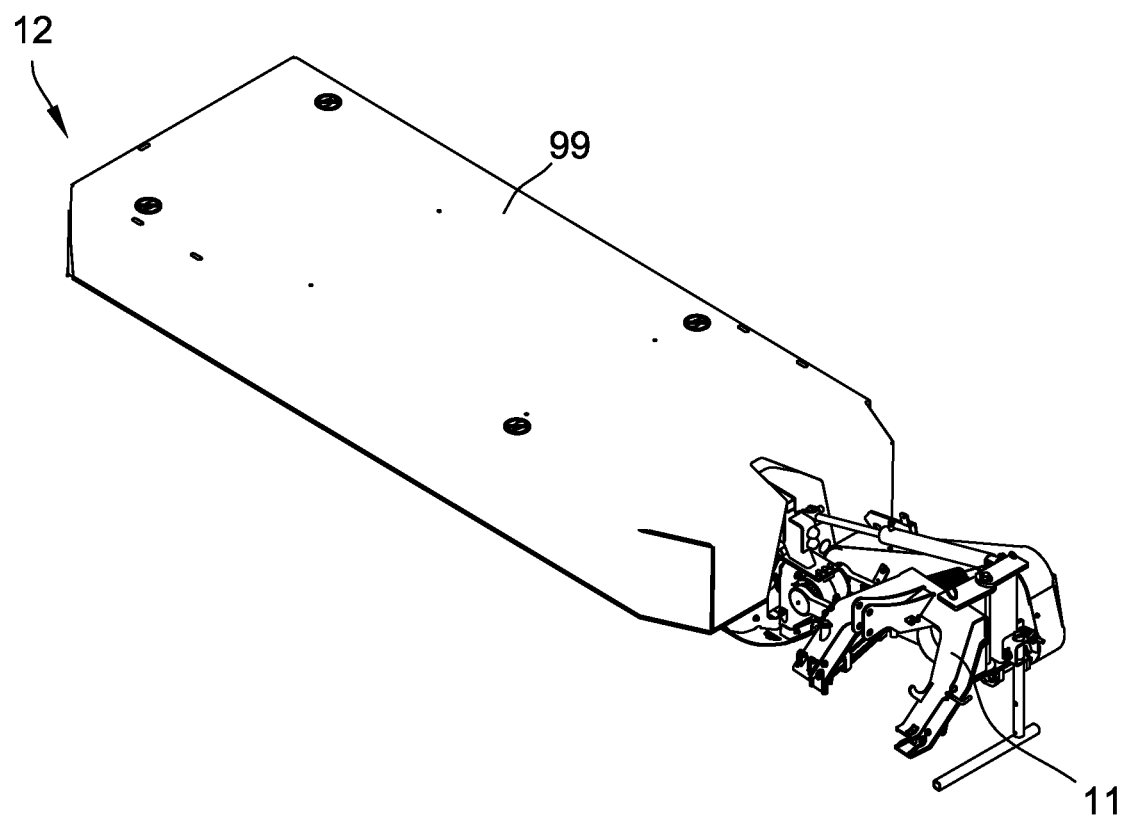
FIG. 4 is a perspective view of an implement.
Figure 8:
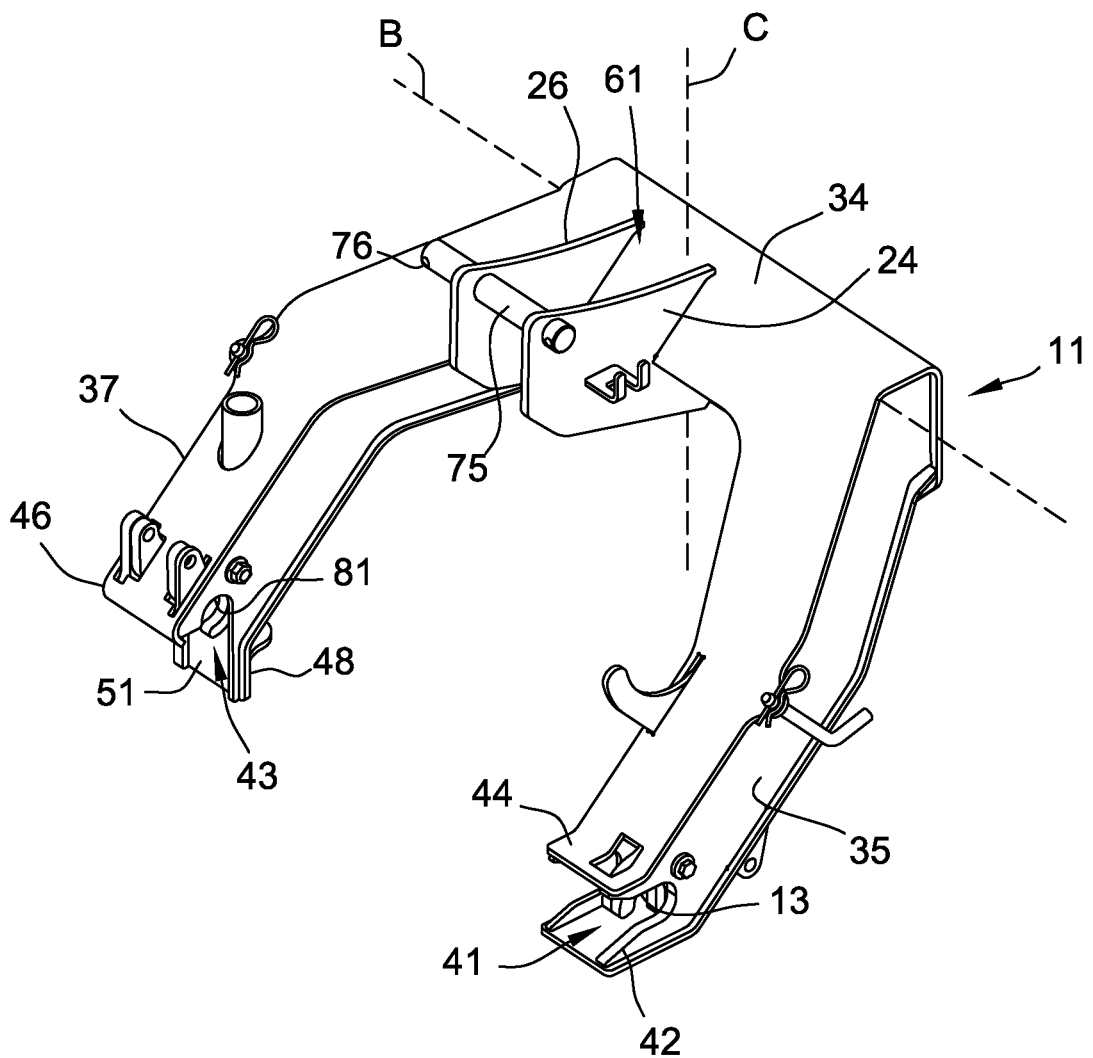
FIG. 8 is a perspective view of the yoke assembly of the three-point hitch mount system.
Figure 9:
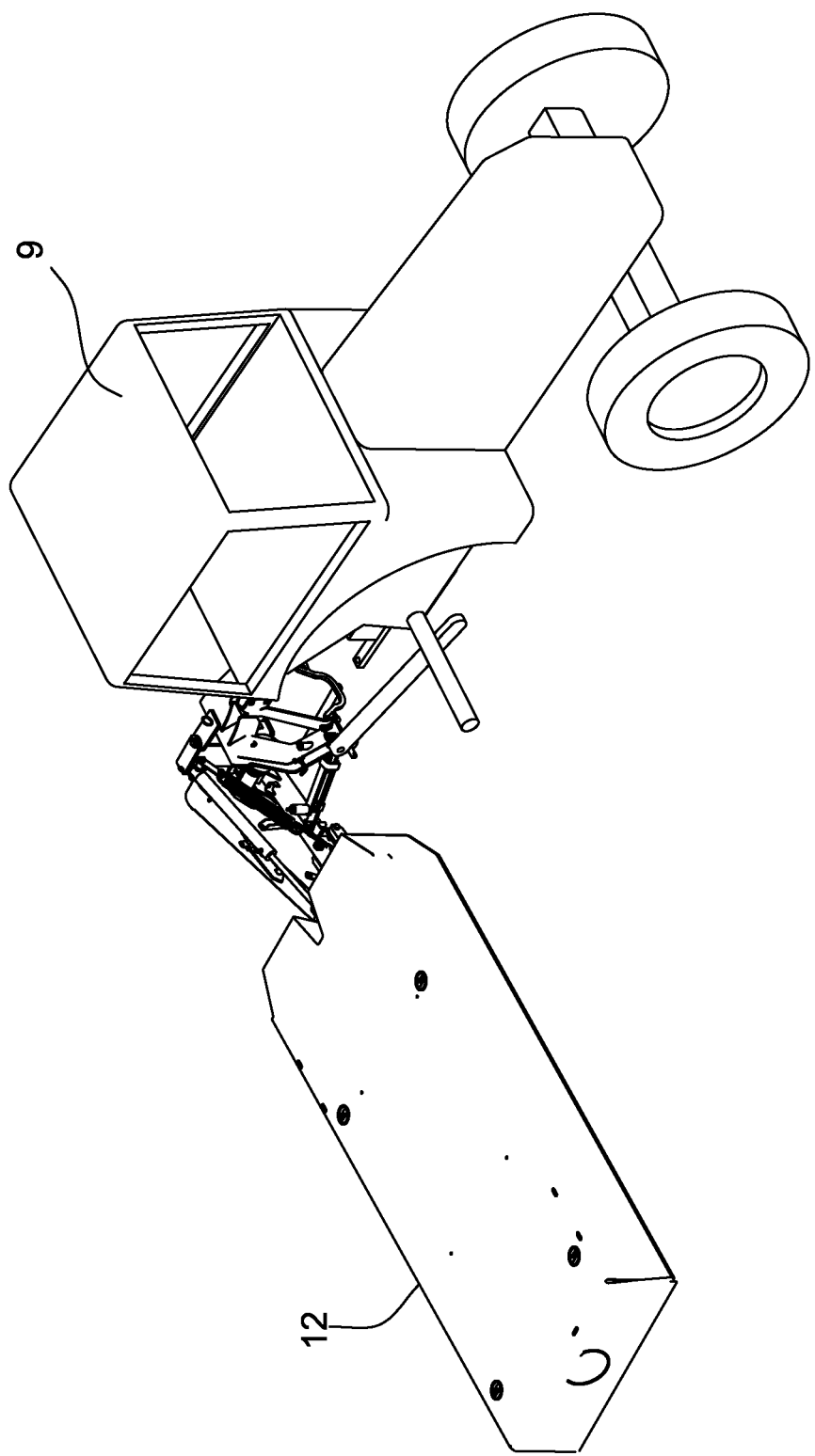
FIG. 9 is a perspective view of the implement connected to a tow vehicle.

The lift bar 7 is attachable to a yoke assembly 11 (FIG. 8). The yoke assembly 11 may be part of an agricultural implement 12 such as a mounted mower (i.e., non-trailed mower) as shown in FIG. 4. As shown in FIG. 9 in which a drive wheel of the tow vehicle 9 is not shown for illustration, when lifted by the tow vehicle 9, the mounted mower 12 is cantilevered to the side from the yoke assembly 11. Alternatively or in addition, the mounted mower 12 may be cantilevered from behind the yoke assembly 11.

Figure 7:
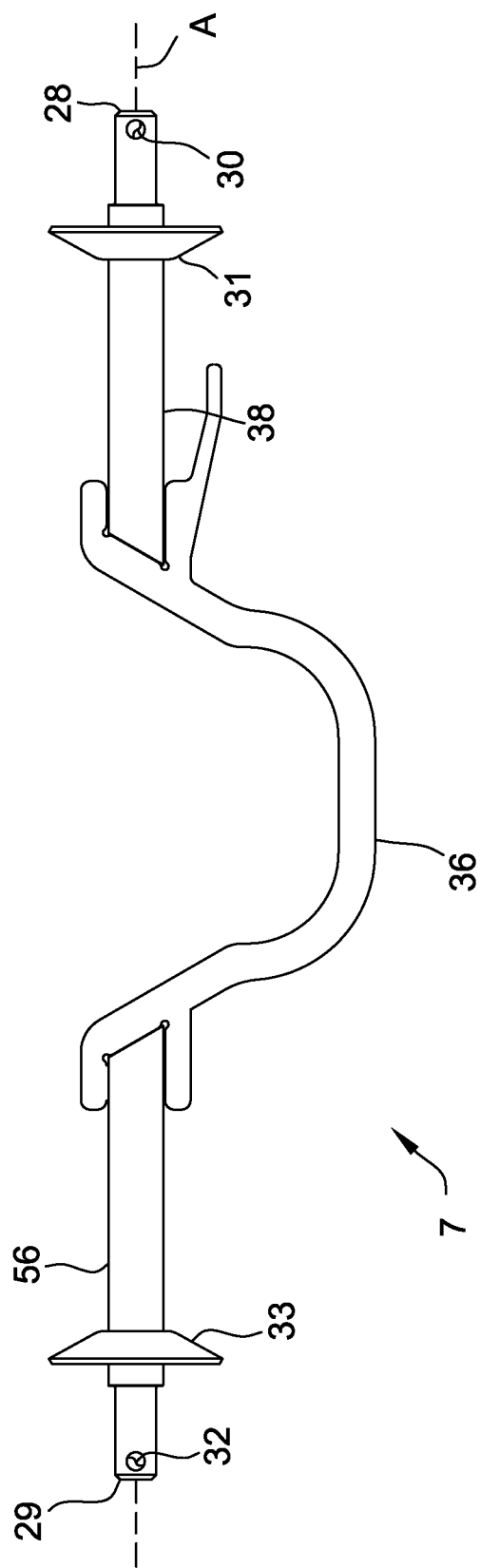
FIG. 7 is a front view of the lift bar of the three-point hitch mount system.

The yoke assembly 11 (FIG. 8) includes a vertical axis C that is orthogonal to the lift bar 7. The yoke assembly 11 includes a body potion 34 that has a lateral axis B that is parallel to the lift bar axis A (FIG. 7) when the lift bar 7 is attached to the yoke assembly 11. The yoke assembly 11 also includes a first arm 35 and a second arm 37 that extend forward (i.e., toward the tow vehicle) and downward from the body portion 34. The first arm 35 includes a forward-facing lift bar slot 41 (which may also be referred to herein as a "first lift bar slot") for removably receiving the lift bar 7 (FIG. 7). The forward-facing lift bar slot 41 is formed between a first arm lower projection 42 and a first arm upper projection 44. In the illustrated embodiment, the first arm lower and upper projections 42, 44 are tapered to guide the lift bar 7 into the forward-facing lift bar slot 41 as the tow vehicle 9 (FIG. 9) is reversed toward the implement 12.

Figure 10:
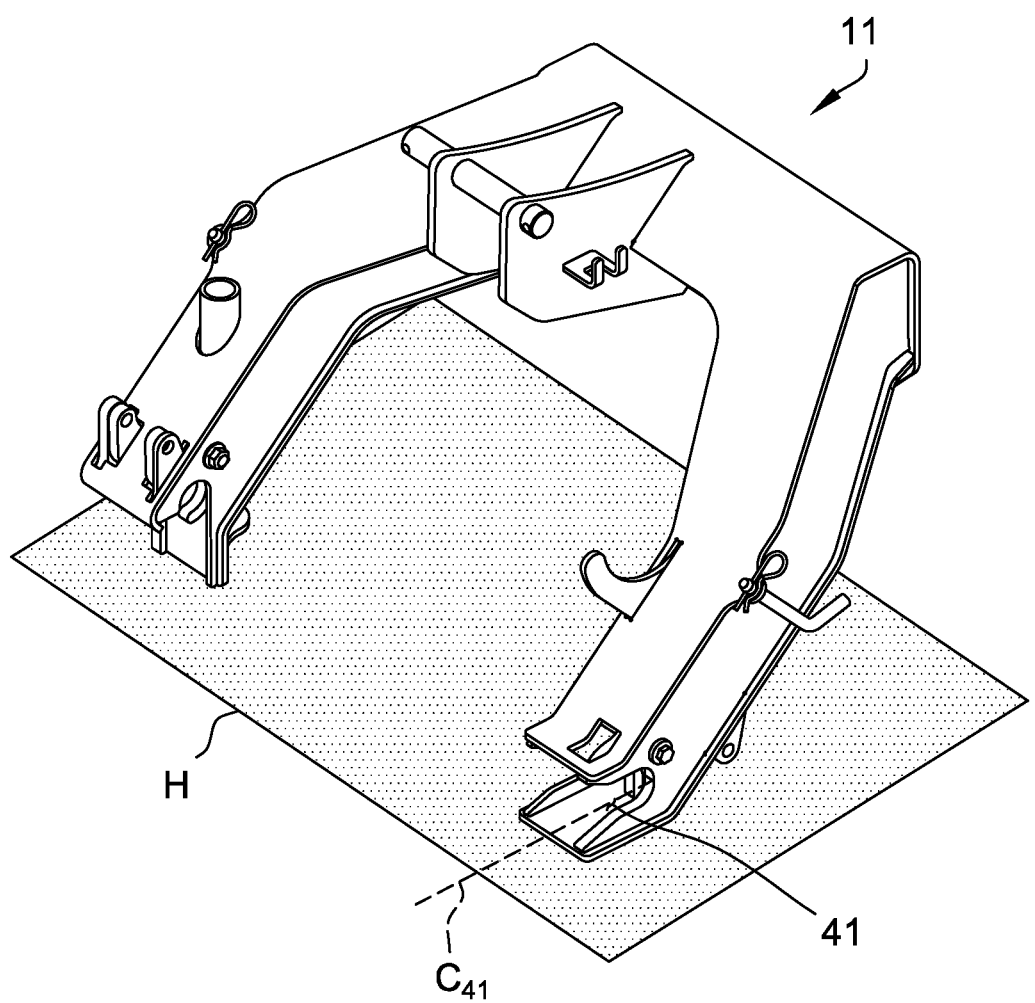
FIG. 10 is a perspective view of the yoke assembly showing a horizontal plane of the yoke assembly.
Figure 11:
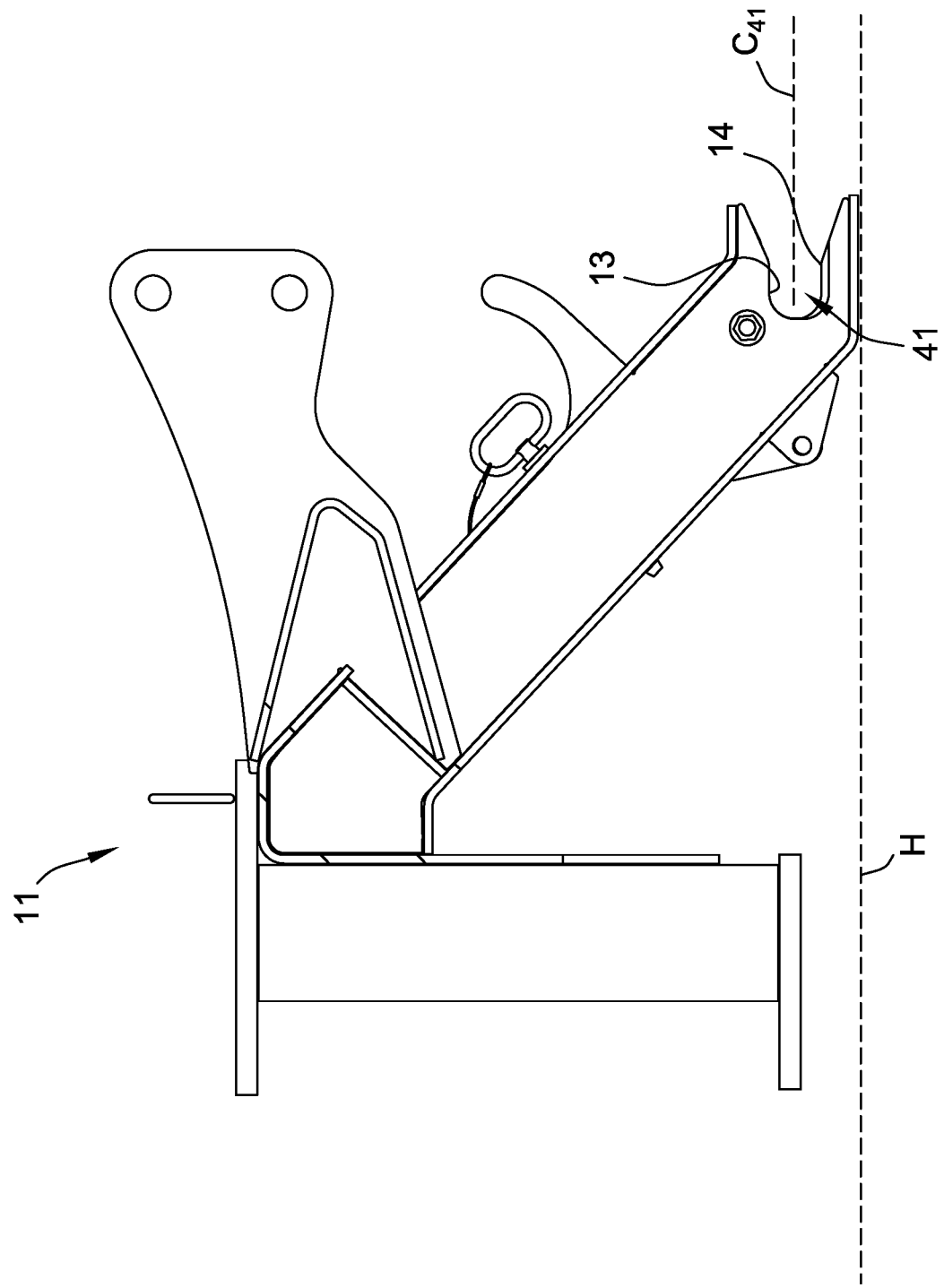
FIG. 11 is a side view of the yoke assembly.

Referring now to FIGS. 10 and 11, the yoke assembly 11 has a horizontal plane H. The horizontal plane H is parallel to the horizontal axis B (FIG. 8) of the yoke assembly 11. Because the hitch mount system 1 may be offset/misaligned when the implement 12 is resting on a supporting surface as discussed below and shown in FIG. 21, the horizontal plane H and axis B are generally not parallel to the supporting surface when the implement is resting on the ground. The forward-facing lift bar slot 41 has a centerline $C_{41}$ (i.e., a line equidistant from the upper surface 13 and lower surface 14 that forms the slot 41 and that passes through the midpoint of the slot 41). The centerline $C_{41}$ of the forward-facing lift bar slot 41 is (1) parallel to the horizontal plane H or (2) forms an angle of less than 35° with the horizontal plane H (or as in other embodiments, less than 30°, less than 20°, less than 10° or less than 5°).

As shown in FIG. 8, the second arm 37 of the yoke assembly 11 includes a downward-facing lift bar slot 43 (which may be referred to herein as a "second lift bar slot") that also removably receives the lift bar 7 (FIG. 7). The downward-facing lift bar slot 43 is formed between a second arm forward projection 46 and a second arm rear projection 48. The second arm rear projection 48 extends below the second arm forward projection 46 to form a stop 51 for contacting the lift bar 7 (FIG. 7) as the tow vehicle moves toward the implement (i.e., the downward-facing lift bar slot 43 is above the stop 51 with respect to the vertical axis C).

Figure 12:
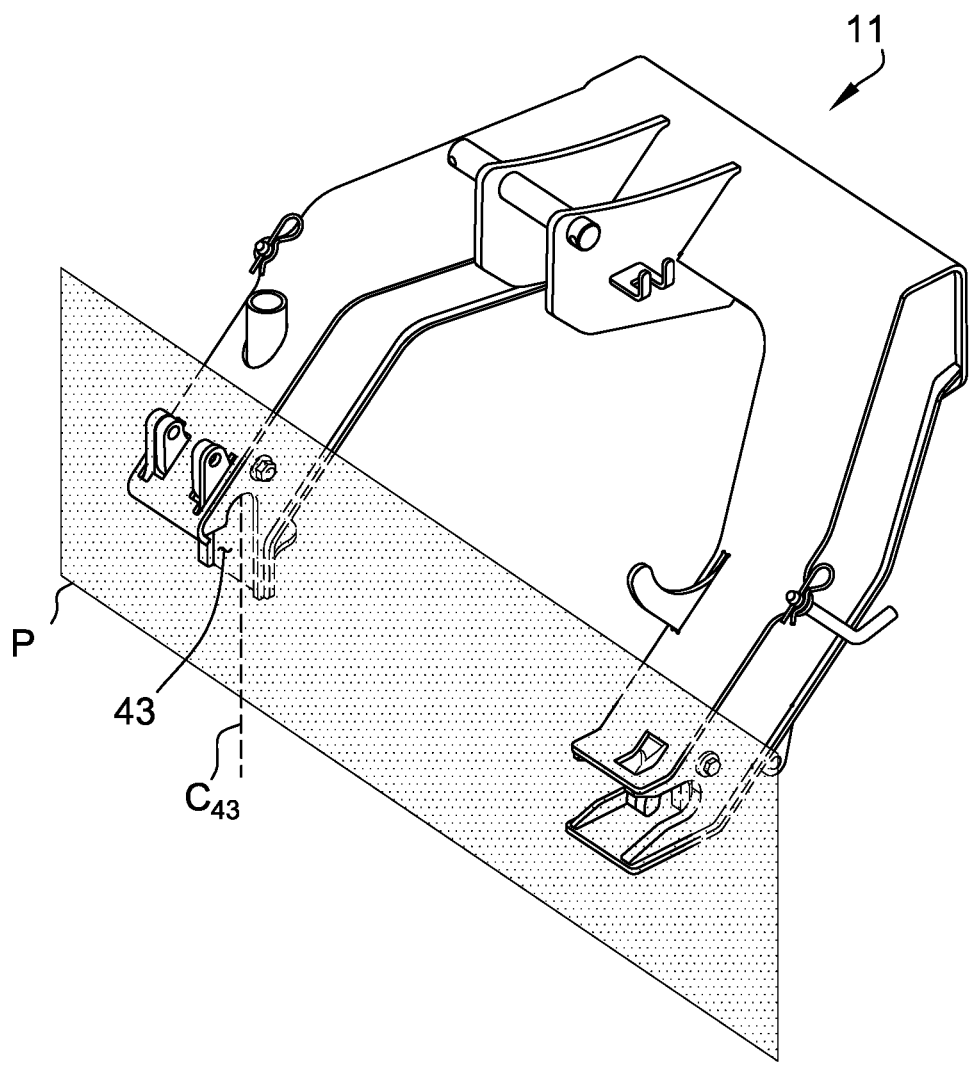
FIG. 12 is a perspective view of the yoke assembly showing the vertical plane of the yoke assembly.
Figure 13:
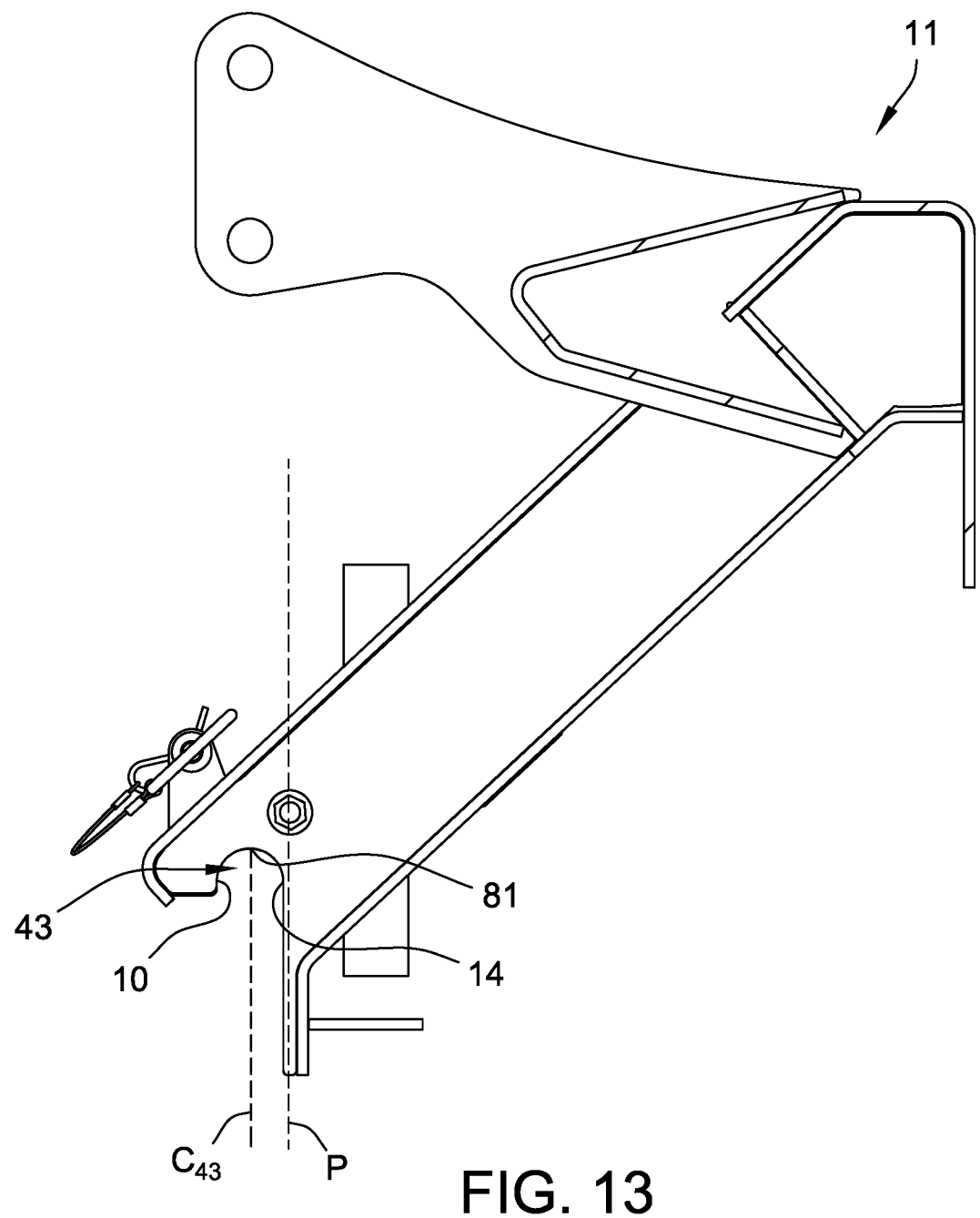
FIG. 13 is another side view of the yoke assembly.

As shown in FIGS. 12-13, the yoke assembly 11 has a vertical plane P. The vertical plane P is parallel to the vertical axis C of the yoke assembly 11. The downward-facing lift bar slot 43 has a centerline $C_{43}$ (i.e., a line equidistant from the forward surface 10 and rear surface 14 that forms the slot 43 and passes through the midpoint of the slot 43). The centerline $C_{43}$ of the downward-facing lift bar slot 43 is (1) parallel to the vertical plane P or (2) forms an angle of less than 35° with the vertical plane P (or as in other embodiments, less than 30°, less than 20°, less than 10° or less than 5°).

In some embodiments, the centerline $C_{41}$ of the forward-facing lift bar slot 41 is offset by at least 60° from the centerline $C_{43}$ of the downward-facing lift bar slot 43 (e.g., is offset at least 70° or at least 80° from the centerline $C_{43}$ of the downward-facing lift bar slot 43 or is offset 90° from the centerline $C_{43}$ of the downward-facing lift bar slot 43).

Referring now to FIG. 8, the yoke assembly 11 includes an upper link mount 61 for connecting the upper link arm 20 (FIG. 2). In the illustrated embodiment, the upper link mount 61 includes first and second brackets 24, 26 each having an opening to receive a pin 75. To attach the upper link arm 20 to the yoke assembly 11, the upper link arm 20 is placed between the brackets 24, 26 to align an opening 53, 59 (FIG. 6) of the upper link arm 20 with the bracket openings. The pin 75 is then inserted through the bracket openings and the upper link arm opening to secure the upper link arm 20 to the upper link mount 61 of the yoke assembly 11. The pin 75 may be secured within the openings by inserting a lock pin (not shown) through a lock pin opening 76.

Figure 22:
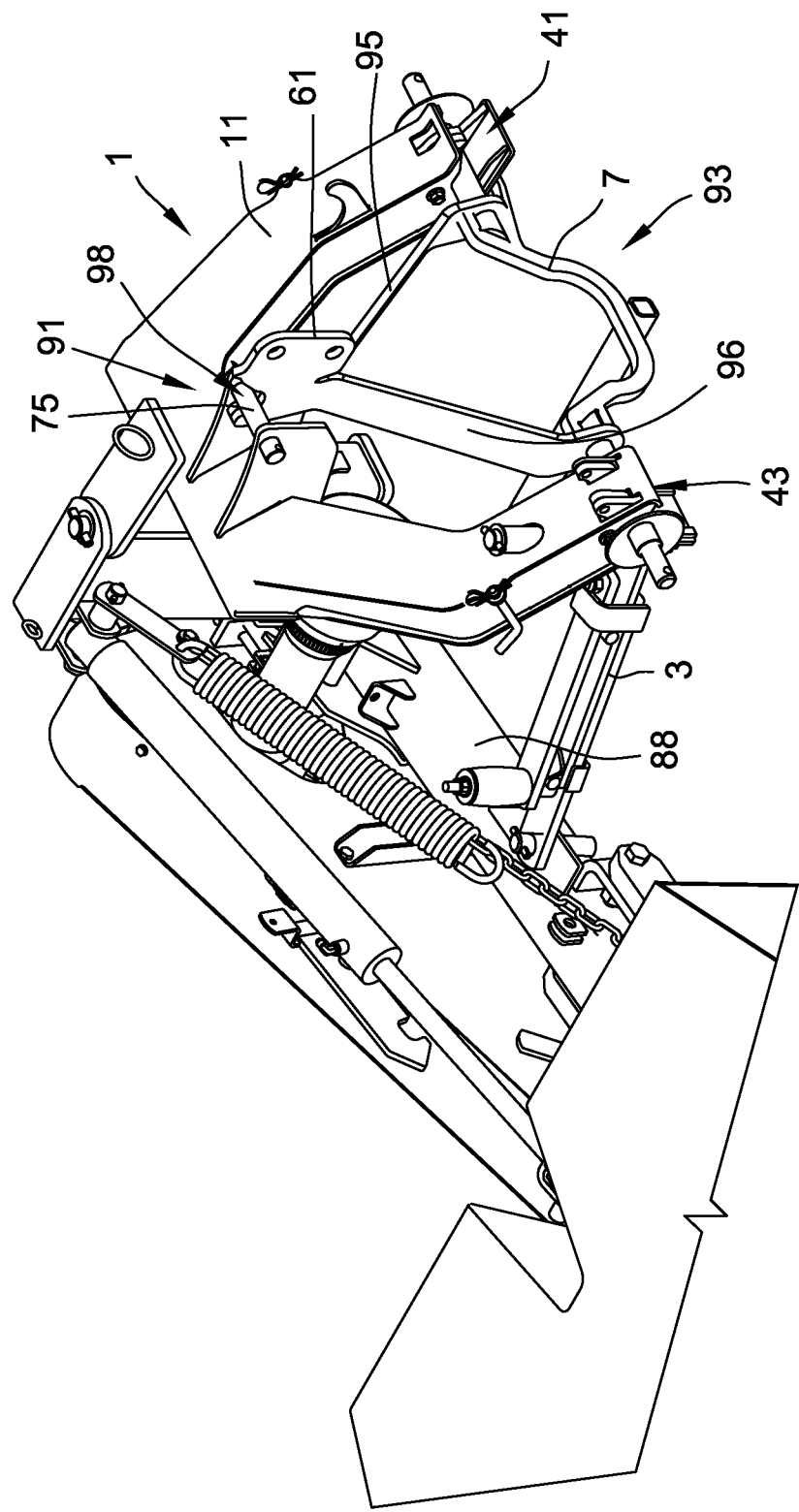
FIG. 22 is a perspective view of an implement with another embodiment of the three-point hitch mount system connected thereto.
Figure 23:
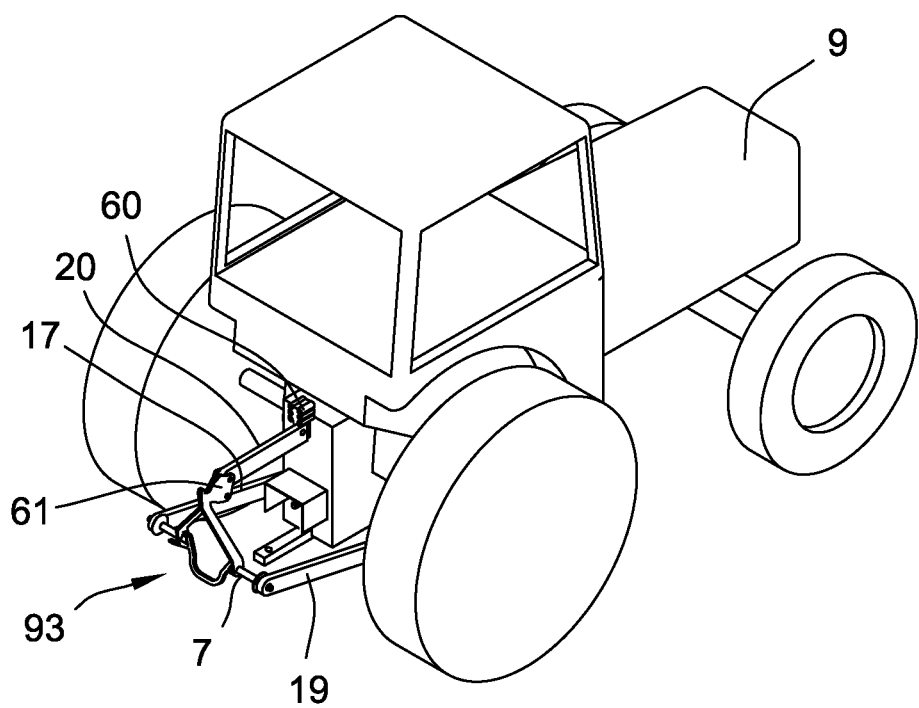
FIG. 23 is a perspective view of the tow vehicle having a three-point lift mount connected thereto

In other embodiments, the upper link mount 61 is connected to a part of the implement 12 separate from the yoke assembly 11 (e.g., the implement frame). Other mounting arrangements may be used to connect the upper link arm 20 such as shown in FIGS. 22-23 described below.

Figure 15:
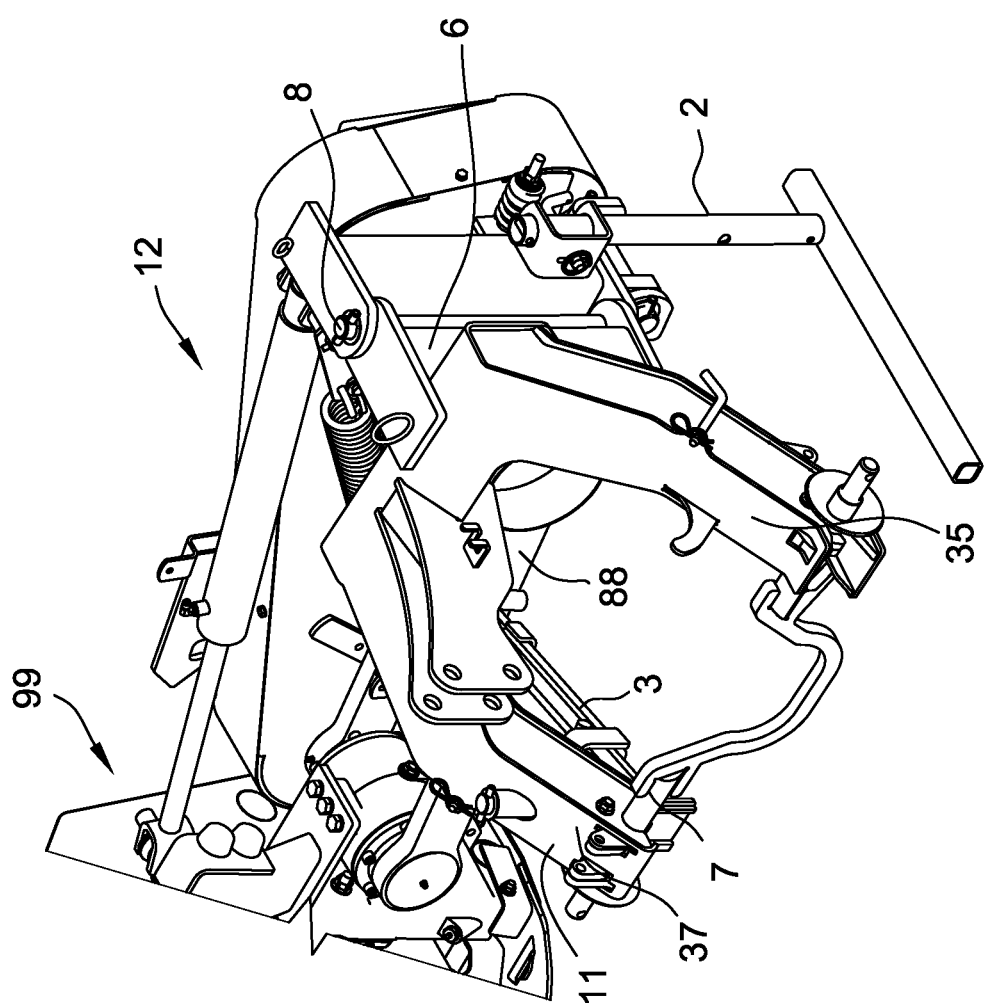
FIG. 15 is a detailed perspective view of the implement.

The yoke assembly 11 may generally be mounted to the implement in any suitable manner to allow the yoke assembly 11 and implement 12 to function as described herein. In the embodiment illustrated in FIG. 15, the yoke assembly 11 is connected to a mounting assembly 6. The mounting assembly 6 includes a mounting pin 8. A linkage 3 connects the second arm 37 of the yoke assembly 11 to the implement frame 88. In some embodiments, the linkage 3 incorporates a break-away feature such that, upon the implement 12 contacting an immovable or heavy object, the implement 12 pivots about the mounting pin 8 to a break-away position. Linkage 3 may be reset by applying a force to the implement 12 to cause it to rotate about the mounting pin 8 back to its operating position.

Figure 21:
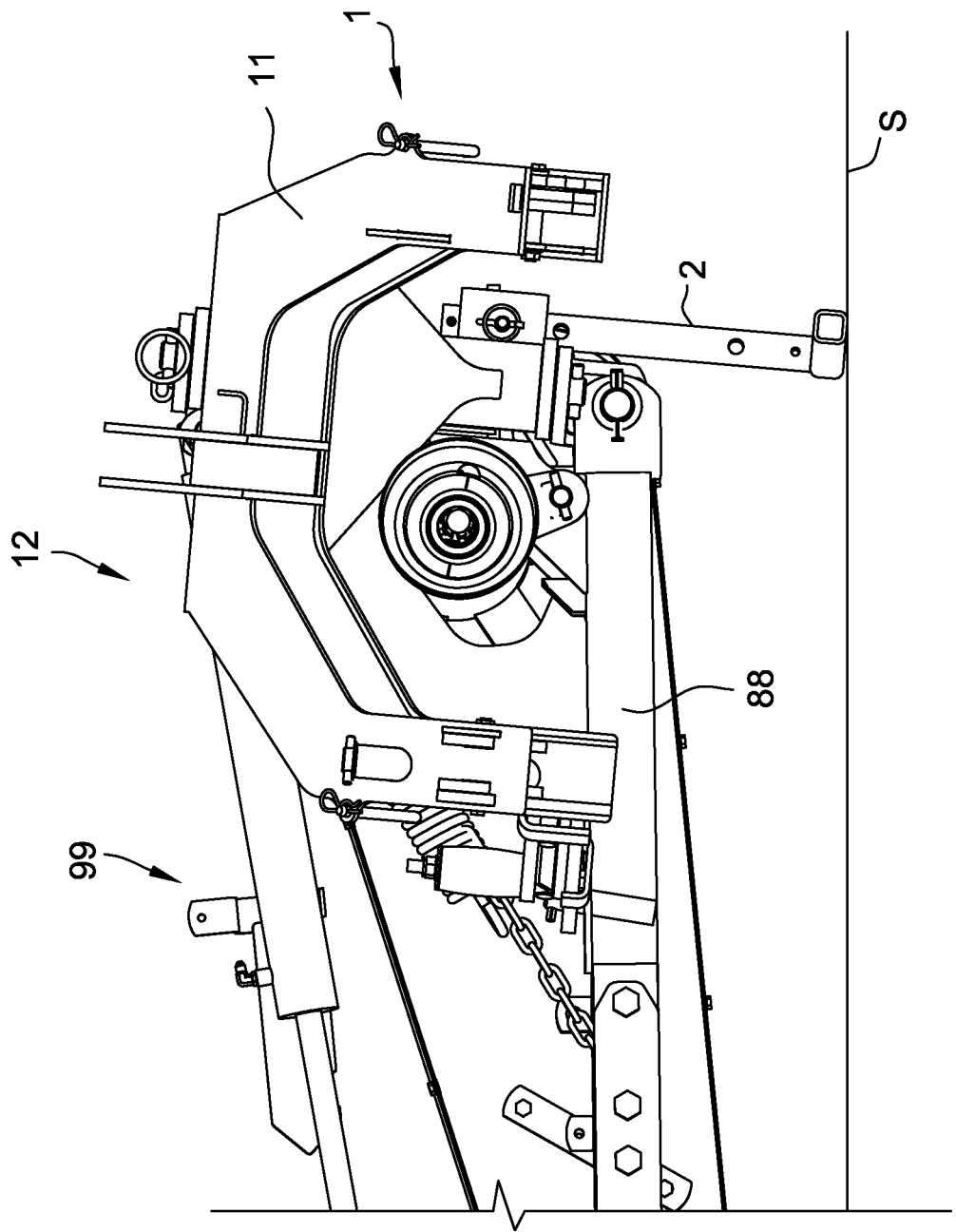
FIG. 21 is a front view of the implement.

As shown in FIG. 21, in the illustrated embodiment, the yoke assembly 11 is tilted with respect to the supporting surface S and with respect to the remainder of the implement 12. The causes the yoke assembly 11 to be tilted with respect to the lift bar 7 (FIG. 7) before the implement is lifted (i.e., the axis of the yoke assembly slots 41, 43 are offset from the lift bar axis). The yoke assembly 11 includes a first lift bar slot upper surface 13 (FIG. 11) and second lift bar slot upper surface 81 (FIG. 13) that contact the lift bar 7 when raising the two lower hitch arms 17, 19. The first lift bar slot upper surface 13 is disposed below the second lift bar slot upper surface 81 such that the lift bar 7 contacts the first lift bar slot upper surface 13 before contacting the second lift bar slot upper surface 81 when raising the lift bar 7 to connect the lift bar 7 to the yoke assembly 11. When lifting the implement from its supporting surface, the implement pivots about the first arm 35 such that second lift bar slot upper surface 81 is lowered relative to the first lift bar slot upper surface 13.

Figure 16:
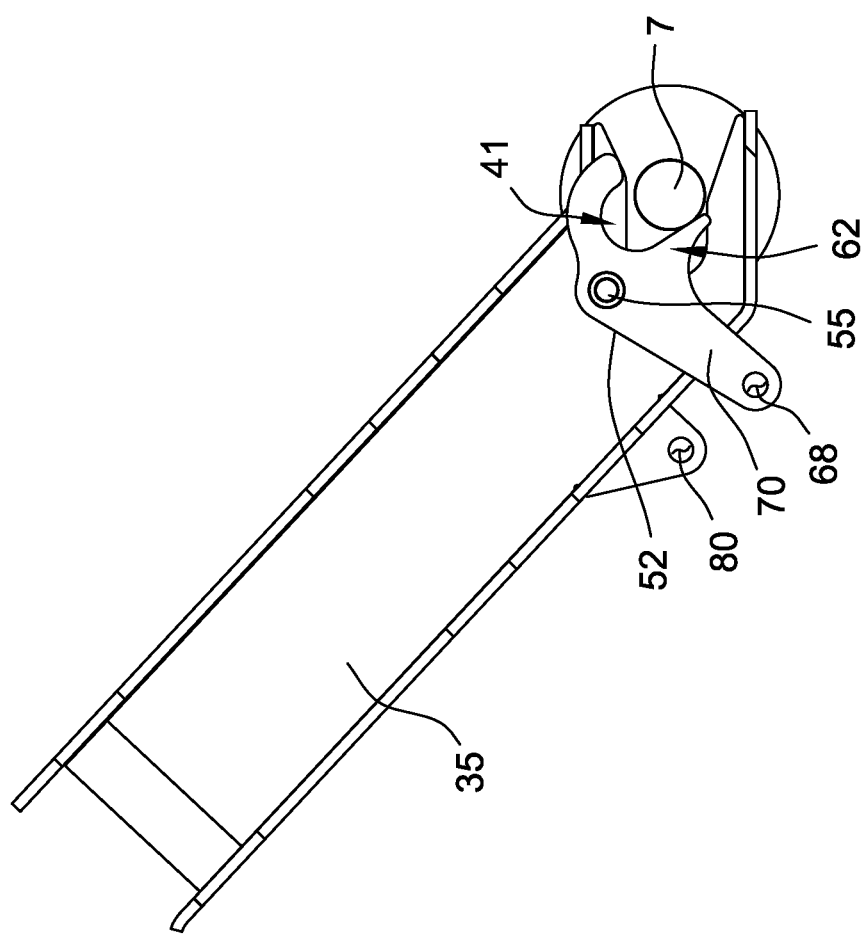
FIG. 16 is a cross-section side view of the first arm of the implement showing a first latch in a resting position and being first engaged by the lift bar.

Referring now to FIG. 16, the three-point hitch mount system includes a first latch 52 for securing the lift bar 7 in the forward-facing lift bar slot 41. The first latch 52 includes a fastening portion 62 for securing the lift bar 7 and a leg portion 70. The first latch 52 pivots about a pin 55 of the first arm 35.

Figure 17:
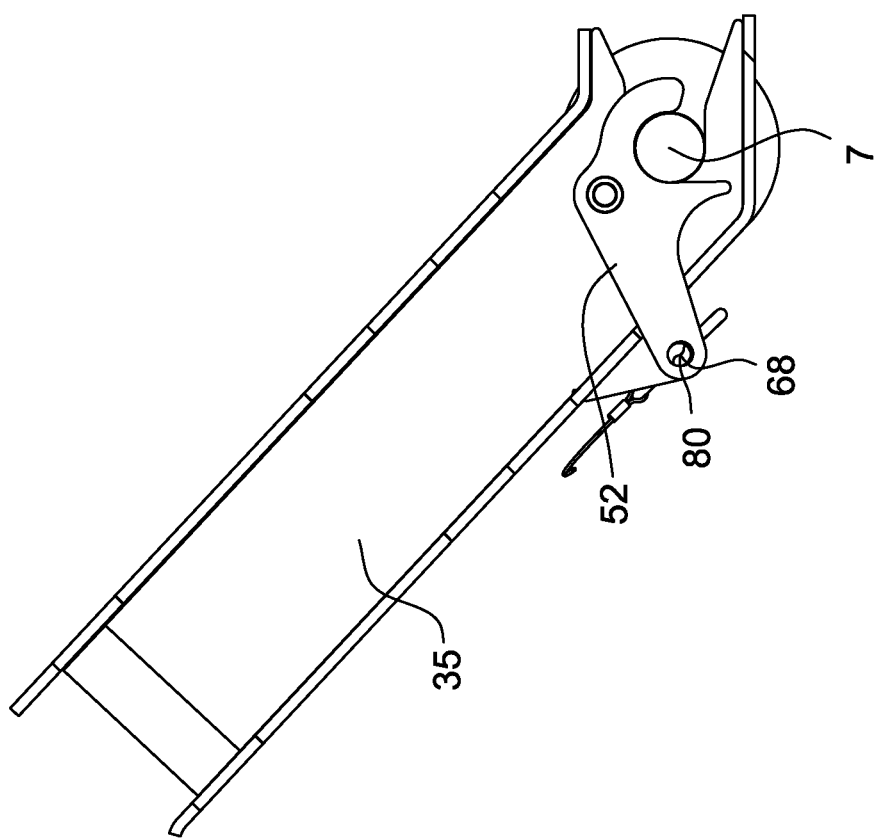
FIG. 17 is a cross-section side view of the first arm of the implement showing a first latch in a locked position with the lift bar received in the forward-facing lift bar slot.

The first latch 52 is shown in its resting position before the lift bar 7 is coupled to the yoke assembly 11 in FIG. 16. When the tow vehicle is propelled toward the yoke assembly, the lift bar 7 contacts the fastening portion 62 of the latch 52. The lift bar 7 pushes the fastening portion 62 of the latch causing the latch 52 to pivot about the pin 55 causing the fastening portion 62 to surround the lift bar 7 as shown in FIG. 17. In this position, a lock-pin 82 (FIG. 20) may be received in a lock-pin opening 68 within the leg portion 70 of the latch 52 and a lock-pin opening 80 of the first arm 35 to secure the latch 52 in the locked position.

Figure 18:
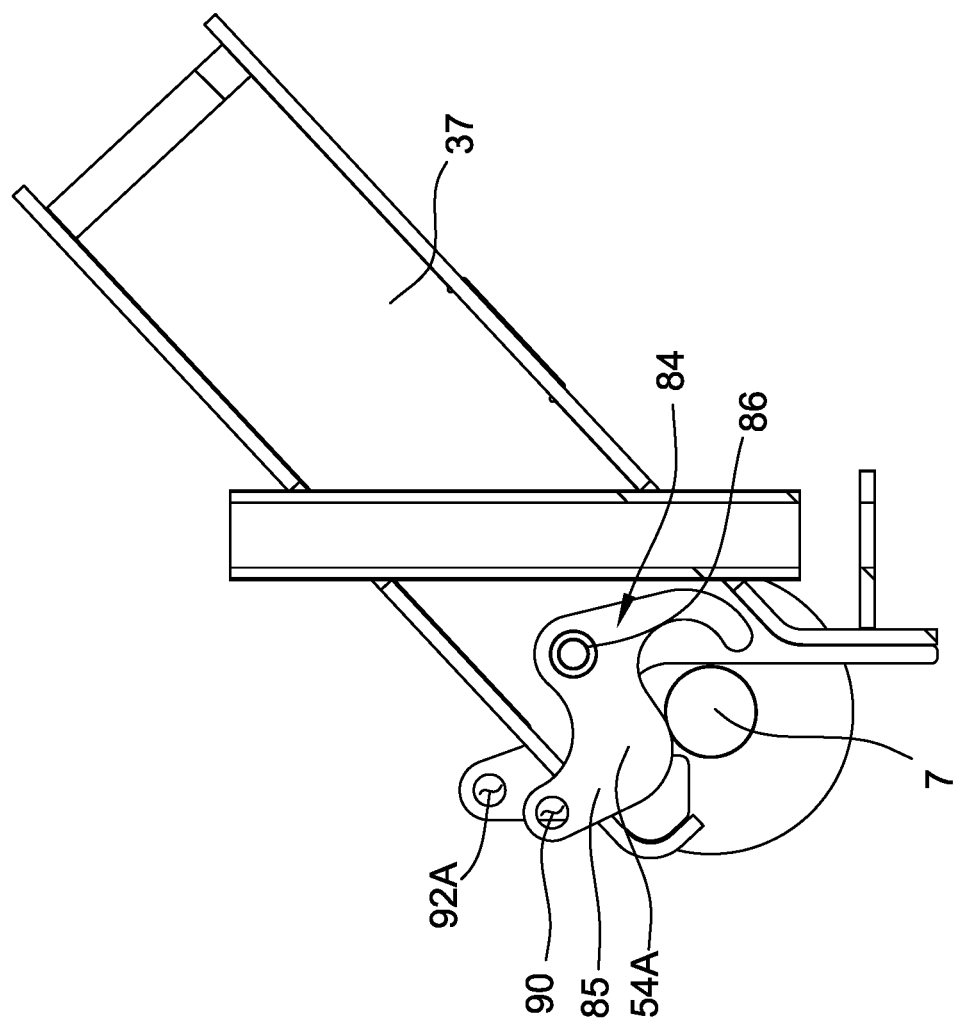
FIG. 18 is a cross-section side view of the second arm of the implement showing a second latch in a resting position and being first engaged by the lift bar.
Figure 19:
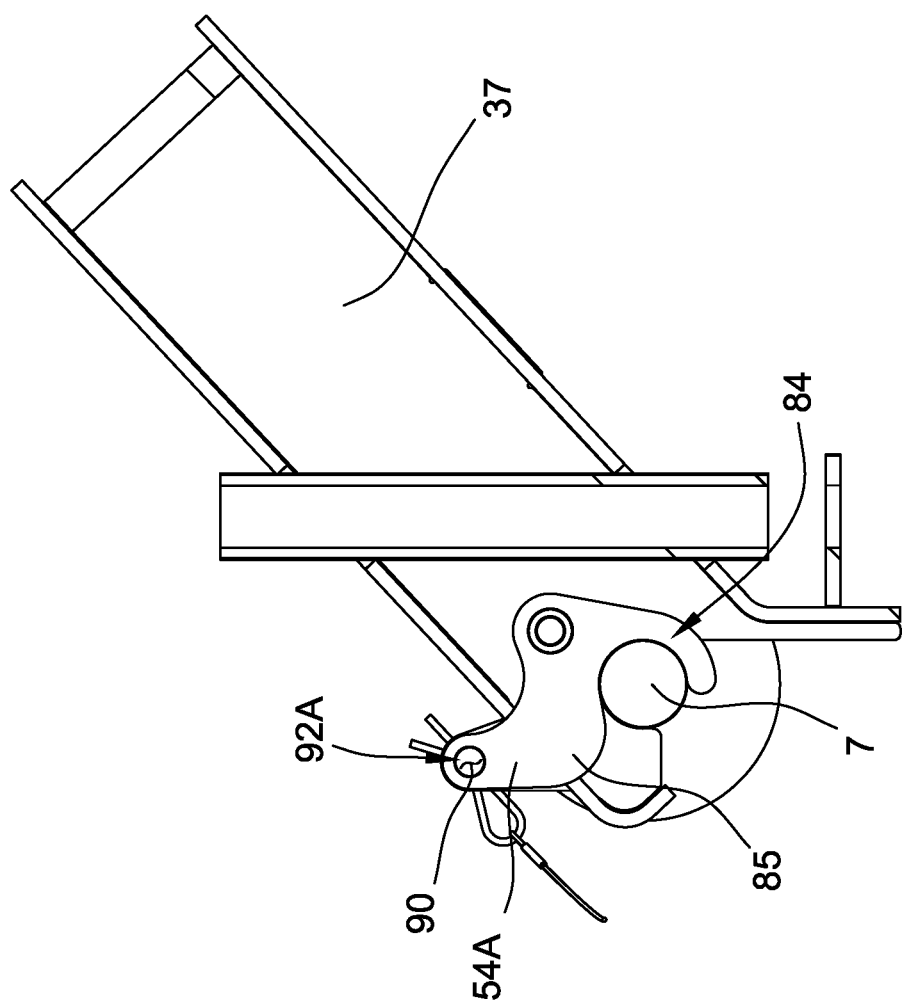
FIG. 19 is a cross-section side view of the second arm of the implement showing a second latch in a locked position with the lift bar received in the downward-facing lift bar slot.
Figure 20:
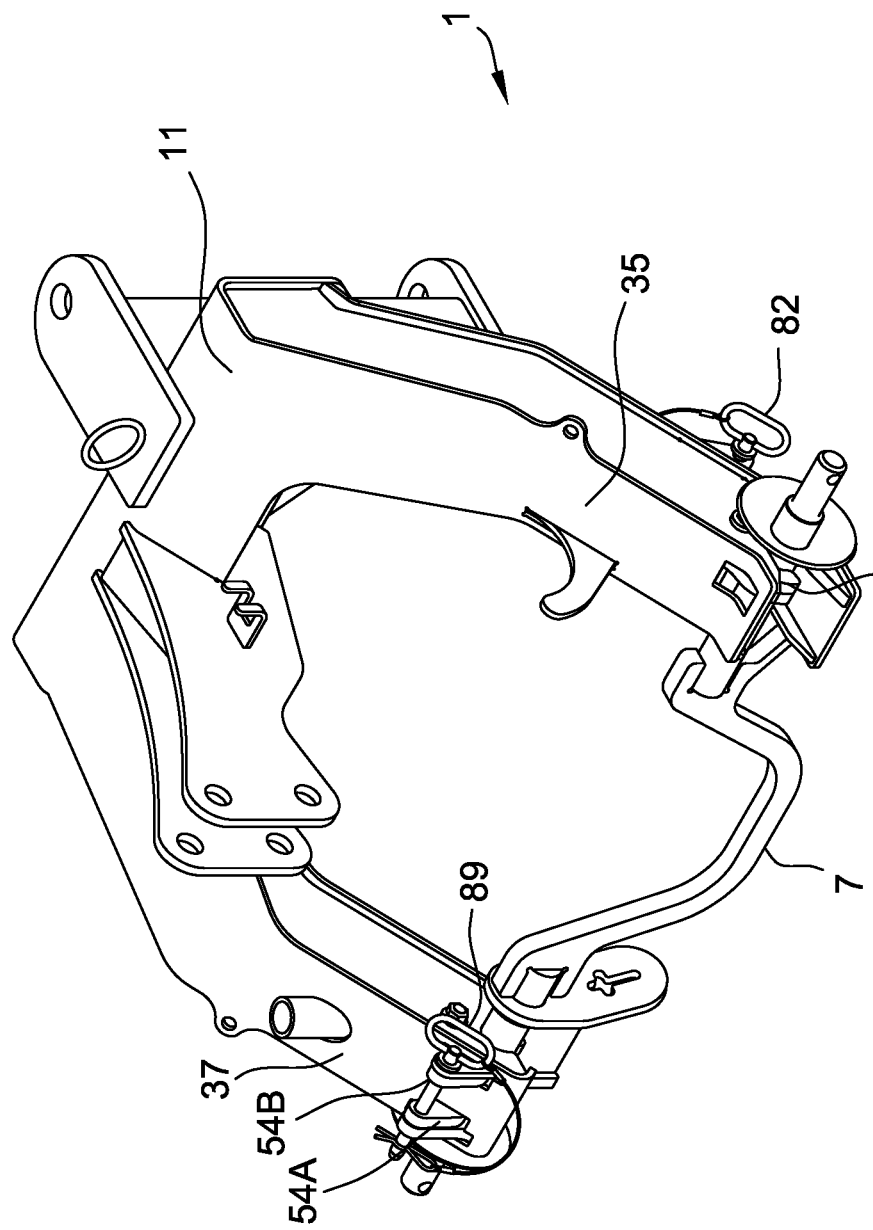
FIG. 20 is a perspective view of the yoke assembly with the lift bar connected thereto.

As shown in FIG. 20, the three-point hitch mount system 1 includes second and third latches 54A, 54B for securing the lift bar 7 in the downward-facing lift bar slot 43. Referring now to FIG. 18 in which the second latch 54A is shown, each latch 54A, 54B includes a fastening portion 84 for securing the lift bar 7 and a leg portion 85. The latches 54A, 54B pivots about a pin 86 of the second arm 37. When the lift bar 7 is raised, the lift bar 7 contacts the latch 54A causing the latch 54A to pivot about the pin 86 causing the fastening portion 84 to surround the lift bar 7 as shown in FIG. 19. In this position, a lock-pin 89 (FIG. 20) may be received in a lock-pin opening 90 of each latch 54A, 54B and lock-pin openings (one opening 92A being shown in FIG. 18) of the second arm 37 to secure each latch 54A, 54B in the locked position.

In the illustrated embodiment, the yoke assembly 11 includes one latch 52 to secure the lift bar 7 in the forward-facing slot 41 and two latches 54A, 54B to secure the lift bar 7 in the downward-facing slot 43. The three-point hitch mount system 1 may include latches in other arrangements such as more or less latches on each arm 35, 37.

To attach the tow vehicle to the implement, an operator first attaches the lift bar 7 (FIG. 3) to the lower hitch arms 17, 19 of the tow vehicle. To couple the lift bar 7 and tow vehicle 9 to the yoke assembly 11, the lower hitch arms 17, 19 are raised or lowered by the operator of the tow vehicle 9 to align the lift bar 7 with the forward-facing slot 41 (FIG. 8). The tow vehicle 9 moves toward the yoke assembly 11 to cause the lift bar 7 to be received in the forward-facing slot 41. The forward-facing slot 41 has a width sufficient to receive the lift bar 7 as the tow vehicle is propelled toward the yoke assembly 11 (i.e., the slot 41 receives the lift bar 7 even with the slot 41 being angled to the lift bar 7 due to the tilt of the yoke assembly 11).

Figure 14:
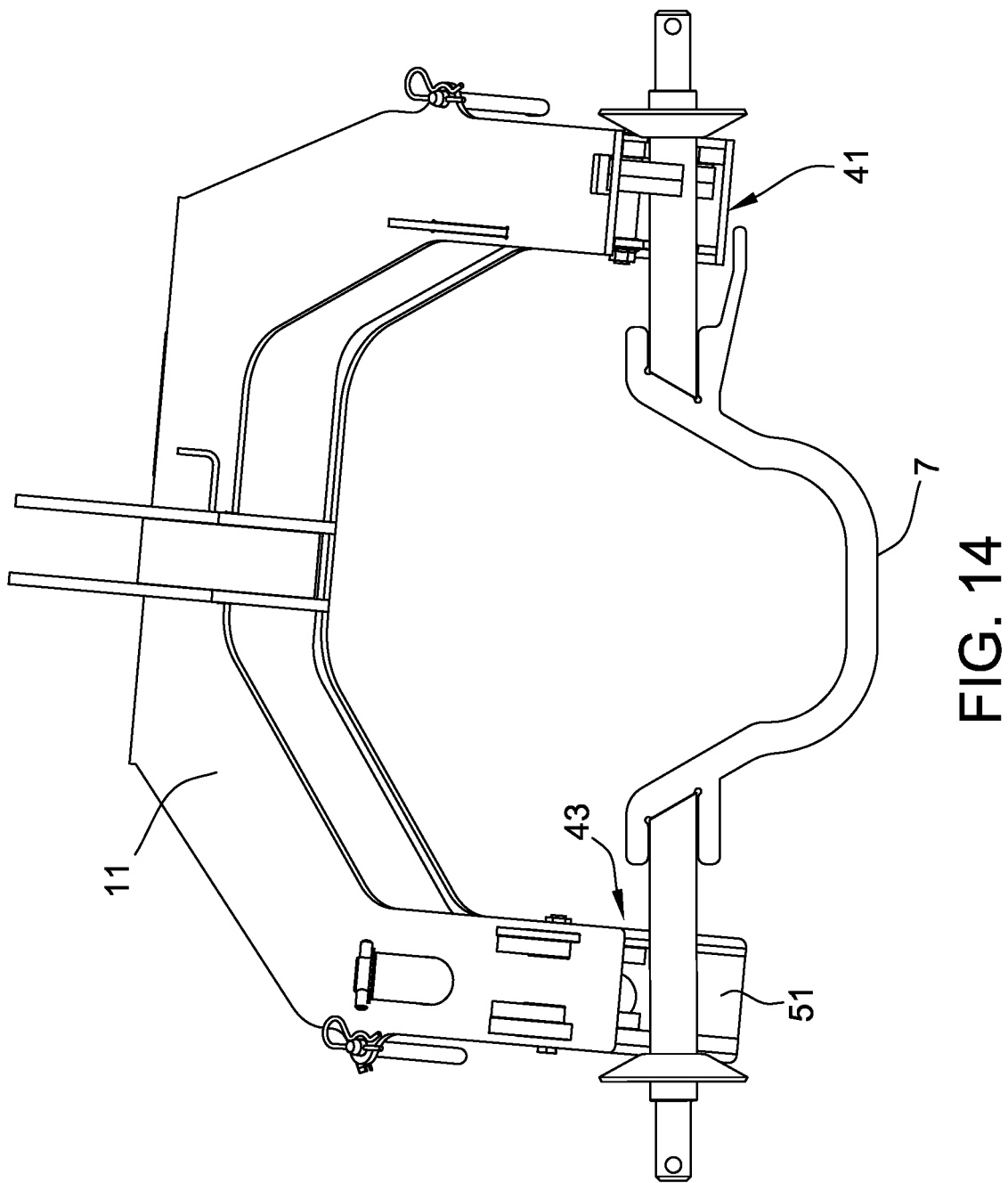
FIG. 14 is a front view of the three-point hitch mount system with the lift bar in the forward-facing lift bar slot.

As the lift bar 7 is received in the forward-facing slot 41, the lift bar 7 contacts the stop 51 (FIG. 14) of the second arm 37 below the downward-facing slot 43. The operator of the tow vehicle (or other person assisting with connection of the implement) connects the upper link arm 20 to the upper link mount 61 (FIG. 8) of the yoke assembly 11 (and the tow vehicle if not previously connected to the tow vehicle). The lower hitch arms 17, 19 are raised to cause the lift bar 7 to be received in the downward-facing slot 43 (FIG. 20). The lock-pins 82, 89 are then installed to lock latches 52, 54A, 54B.

To decouple the lift bar 7 from the yoke assembly 11, after the implement 12 is lowered and the upper link arm 20 is disconnected, the lock-pins 82, 89 are removed from each latch 52, 54A, 54B and the lift bar 7 is lowered to remove the lift bar 7 from the downward-facing slot 43. The tow vehicle 9 is moved forward to cause the lift bar 7 to disengage from the forward-facing slot 41. Gravity and/or movement of the lift bar 7 causes each latch 52, 54A, 54B to return to its resting position for subsequent connection of the lift bar 7 and the yoke assembly 11. The latches 52, 54A 54B remain in the resting position due to the position of the center of mass of the latch. Alternatively or in addition, a biasing mechanism, such a spring, could be associated with each of the latches 52, 54A, 54B to bias the latches 52, 54A, 54B in their resting (non-deployed) position.

As shown in FIG. 21, the implement 12 may include a stand 2 for supporting the implement 12 when sitting on a supporting surface S. The implement 12 typically includes a driveline that transfers power from the PTO drive assembly of the tow vehicle to a powered device of the implement. The PTO driveline may be a telescoping assembly with universal joints and shielding that allows relative movement between the tow vehicle and the implement that is typical with mobile operation.

The three-point hitch mount system 1 may be used to carry a variety of mounted, powered devices 99 (FIG. 4) such as the illustrated mounted mower (i.e., non-trailed mower). The mounted mower may be a disk mower or sickle mower. Generally, the implement 11 may be any device (e.g., bale mover) that is capable of incorporating the three-point hitch mount system 1 as described herein unless stated otherwise.

In some embodiments, the powered device 99 to which the three-point hitch mount system 1 is connected is canti-levered from the yoke assembly 11 (i.e., side cantilevered). In such embodiments, the forward-facing slot 41 is opposite the powered device 99 and the downward-facing slot 43 is disposed between the powered device 99 and the forward-facing slot 41 (i.e., the downward-facing slot 43 is closer to the powered device 99 than the forwarding-facing slot 41).

Another embodiment of the three-point hitch mount system 1 is shown in FIGS. 22-23. The three-point hitch mount system 1 includes a yoke assembly 11 such as the yoke assembly described above. The hitch mount system 1 also includes a three-point lift mount 93. The three-point lift mount 93 includes a lift bar 7 for connecting to the lower hitch arms 17, 19 of the tow vehicle 9. The lift bar 7 is connected to an upper link mount 61 by arms 95, 96. The upper link mount 61 connects to the upper link arm 20 that is connected to the tow vehicle 9 (FIG. 23). The upper link mount 61 includes an aperture 91 such as a notch 98 to receive a pin 75 of the yoke assembly 11. As shown in FIG. 22, the pin 75 is supported on both sides by the yoke assembly 11. To connect the three-point lift mount 93 to the yoke assembly 11, the lift bar 7 is aligned with the forward-facing slot 41 to receive the lift bar 7 in the slot. The length of the upper link arm 20 may be adjusted to align the aperture 91 of the upper link mount 61 with the pin 75 of the yoke assembly 11. As the lower hitch arms 17, 19 are raised, the yoke assembly 11 rotates relative to the three-point lift mount 93 (and tow vehicle) about the forward-facing lift bar slot 41. This allows the lift bar 7 to engage the downward-facing lift bar slot 43 while the notch 98 concurrently catches the pin 75 of the yoke assembly. The lower hitch arms 17, 19 continue to raise to cause the lift bar 7 to be received (and, in some embodiments, fully seated) in the downward-facing slot 43. The lift bar 7 may be locked by latches 52, 55A, 54B.

Figure 24:
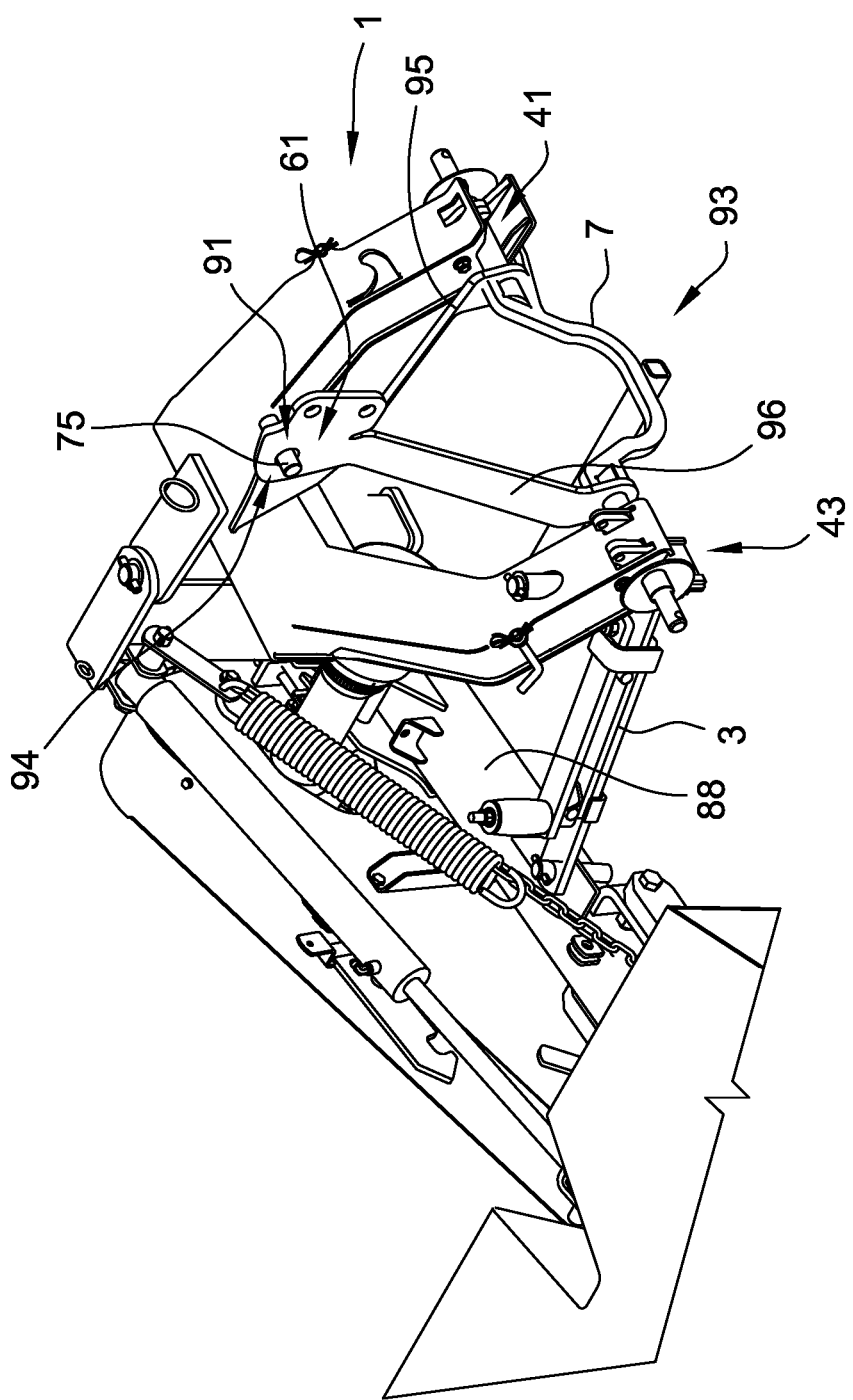
FIG. 24 is a perspective view of an implement with another embodiment of the three-point hitch mount system connected thereto.

Another embodiment of the three-point hitch mount system 1 is shown in FIG. 24. The three-point hitch mount system 1 includes a yoke assembly 11 such as a yoke assembly described above. The hitch mount system 1 also includes a three-point lift mount 93 having a lift bar 7 and upper link mount 61. In the embodiment illustrated in FIG. 24, the aperture 91 is an opening 94 formed in the upper link mount 60. The pin 75 is cantilevered from the yoke assembly 11. The opening 94 receives the pin 75 as the lower hitch arms 17, 19 are raised and the yoke assembly 11 rotates.

Figure 25:
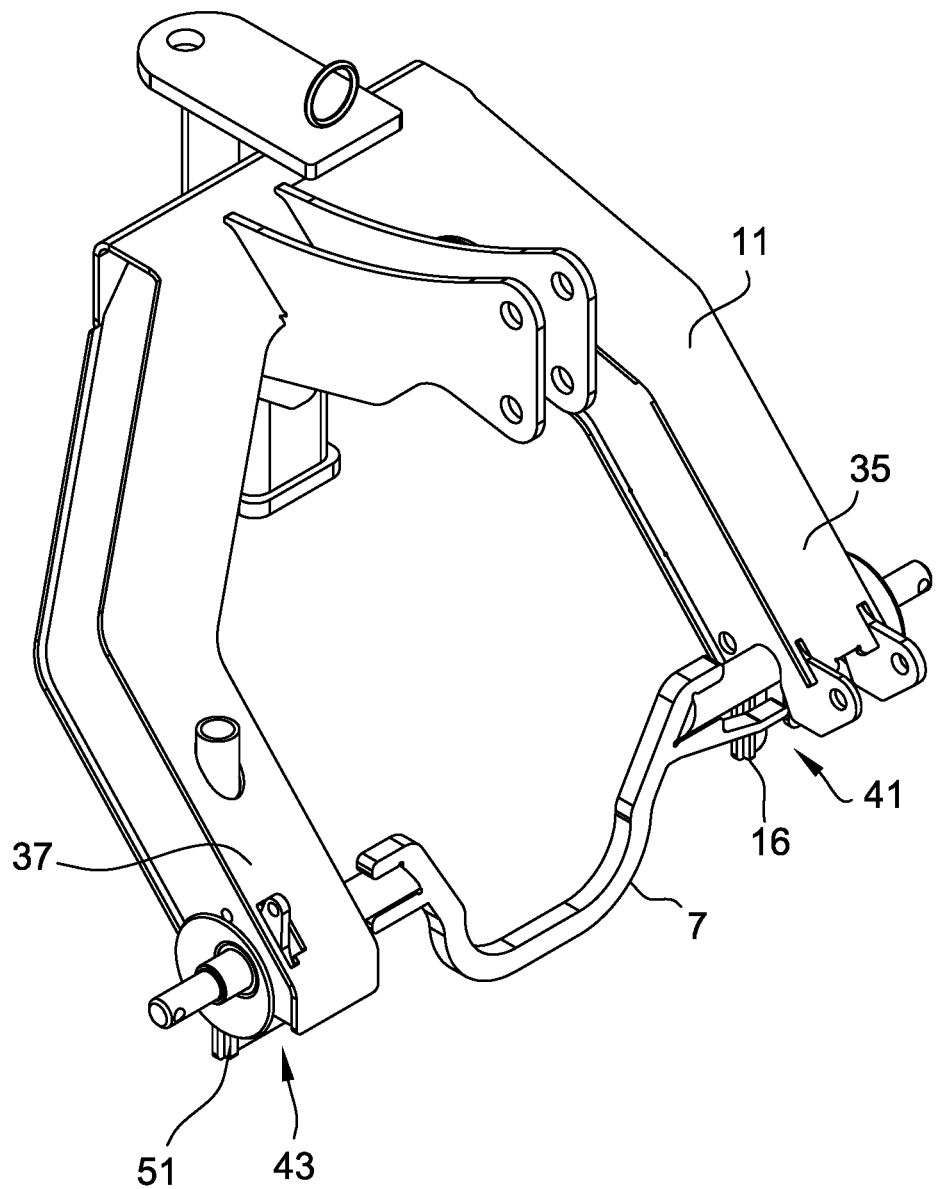
FIG. 25 is another embodiment of a yoke assembly having two downward-facing slots with the lift bar connected thereto.

Referring now to FIG. 25, another embodiment of the yoke assembly 11 is shown. In the embodiment illustrated in FIG. 25, the yoke assembly 11 includes two downward-facing slots 41, 43. The tow vehicle is propelled toward the yoke assembly 11 to cause the lift bar 7 to contact stops 16, 51 on each arm 35, 37. The lower hitch arms 17, 19 are raised to receive the lift bar 7 in the downward-facing slots 41, 43. The lift bar 7 may then be secured by latches.

Compared to conventional mounting systems, the three-point hitch mount system described above has several advantages. By tilting the yoke assembly relative to the rest of the implement and by using forward-facing and down-ward-facing slots, the tow vehicle may be relatively quickly and easily mounted to the implement, which may be par-ticularly useful when only the tow vehicle operator performs the steps to connect the implement. Downward-facing and forward-facing slots that are vertically offset allow the implement to be more easily mounted when resting on an uneven surface. Use of a lift bar that connects to the tractor allows a variety of tractors to connect to the implement.

In embodiments in which the implement is cantilevered, the loads on each arm of the implement may change or even reverse. For example, when the implement is a mounted mower, once the mower is lowered to the ground, the load on the arm furthest away from the mower reverses. Arrang-ing the slot furthest away from the mower to be forward-facing allows the reversed load to be carried through the frame structure rather than the latch. When the tow vehicle is moving forward, the draft load (i.e., the load used to drag the implement along the ground) is offset by a load from the mower frame against the lift bar in the forward direction. The surface of the forward-facing slot is pressed against the shaft rather than the latch being pressed against the shaft. In this arrangement, the slot furthest away from the mower is oriented to have the highest load bearing capacity for the horizontal load (which may be the highest load on the hitch point furthest from the mower). Use of a downward-facing slot nearest the mower enables the upper surface of the slot to carry the majority of the weight of the mower when the mower is raised. When the mower is folded upward for travel, the loads may vary during travel due to variations in the supporting surface (e.g., road). Further, depending on the degree at which the mower is folded, the mower weight may shift over center and put a downward load on both sides of the yoke assembly. Shifting of the mower weight during travel may also cause loads to reverse. Use of a forward-facing slot and downward-facing slot suitably accommodates reversal of such loads.

In embodiments in which the arm of the yoke assembly includes a downward-facing slot that includes two latches, the latches provide additional surface area for contacting the lift bar and additional strength when loads are reversed. Use of a lift bar allows sway stabilizers (e.g., sway blocks) to be adjusted after the lift bar is in place to achieve proper offset of the implement.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A three-point hitch mount system for attaching an implement to a tow vehicle having two lower hitch arms and an upper link arm, the three-point hitch mount system comprising:
    a lift bar configured to be attached to the two lower hitch arms of the tow vehicle;
    a yoke assembly configured to be attached to the implement and comprising:
        a first arm having a forward-facing lift bar slot for removably receiving the lift bar; and
        a second arm having a downward-facing lift bar slot for removably receiving the lift bar;
    an upper link mount configured to be connected to the upper link arm.

2. The three-point hitch mount system as set forth in claim 1 wherein the hitch mount system has a horizontal plane, the forward-facing lift bar slot having a centerline that is (1) parallel to the horizontal plane or (2) forms an angle of less than 35° with the horizontal plane.

3. The three-point hitch mount system as set forth in claim 1 wherein the hitch mount system has a vertical plane, the downward-facing lift bar slot having a centerline that is (1) parallel to the vertical plane or (2) forms an angle of less than 35° with the vertical plane.

4. The three-point hitch mount system as set forth in claim 1 wherein the forward-facing lift bar slot has a centerline that is offset by at least 60° from a centerline of the downward-facing lift bar slot.

5. The three-point hitch mount system as set forth in claim 1 wherein the forward-facing lift bar slot has a centerline that is offset by at least 80° from a centerline of the downward-facing lift bar slot.

6. The three-point hitch mount system as set forth in claim 1 wherein the second arm comprises a stop for contacting the lift bar as the tow vehicle moves toward the implement, the stop being disposed below the downward-facing lift bar slot.

7. The three-point hitch mount system as set forth in claim 1 comprising
    a first latch for securing the lift bar in the forward-facing lift bar slot; and
    a second latch for securing the lift bar in the downward-facing lift bar slot.

8. The three-point hitch mount system as set forth in claim 1 wherein the upper link mount and the lift bar are part of a three-point lift mount, the three-point lift mount being configured to be removably connected to the tow vehicle and removably connected to the yoke assembly.

9. A mounted mower attachable to a tow vehicle, the mower comprising the three-point hitch mount system as set forth in claim 1, the mower being cantilevered from the three-point hitch mount system.

10. A three-point hitch mount system for attaching an implement to a tow vehicle having two lower hitch arms and an upper link arm, the three-point hitch mount system comprising:
    a lift bar configured to be attached to the two lower hitch arms of the tow vehicle;
    a yoke assembly configured to be attached to the implement and comprising:
        a first arm having a first lift bar slot oriented for removably receiving a first end of the lift bar as the lift bar is moved with the tow vehicle moving along a supporting surface towards the implement; and
        a second arm having a second lift bar slot oriented for removably receiving a second end of the lift bar as the lift bar is raised by the lower hitch arms of the tow vehicle;
    an upper link mount configured to be connected to the upper link arm.

11. The three-point hitch mount system as set forth in claim 10 wherein the first lift bar slot has a centerline that is offset by at least 60° from a centerline of the second lift bar slot.

12. The three-point hitch mount system as set forth in claim 10 wherein the first lift bar slot has a centerline that is offset by at least 80° from a centerline of the second lift bar slot.

13. The three-point hitch mount system as set forth in claim 10 wherein the second arm comprises a stop for contacting the lift bar as the tow vehicle moves toward the implement, the stop being disposed below the second lift bar slot.

14. The three-point hitch mount system as set forth in claim 10 comprising
   a first latch for securing the lift bar in the first lift bar slot; and
   a second latch for securing the lift bar in the second lift bar slot.

15. The three-point hitch mount system as set forth in claim 10 wherein the upper link mount and the lift bar are part of a three-point lift mount, the three-point lift mount being configured to be removably connected to the tow vehicle and removably connected to the yoke assembly.

16. A mounted mower attachable to a tow vehicle, the mower comprising the three-point hitch mount system as set forth in claim 10, the mower being cantilevered from the three-point hitch mount system.

\* \* \* \* \*